United States Patent
Virolainen et al.

(10) Patent No.: US 8,457,328 B2
(45) Date of Patent: Jun. 4, 2013

(54) METHOD, APPARATUS AND COMPUTER PROGRAM PRODUCT FOR UTILIZING SPATIAL INFORMATION FOR AUDIO SIGNAL ENHANCEMENT IN A DISTRIBUTED NETWORK ENVIRONMENT

(75) Inventors: Jussi Virolainen, Espoo (FI); Jarmo Hiipakka, Espoo (FI)

(73) Assignee: Nokia Corporation, Espoo (FI)

( * ) Notice: Subject to any disclaimer, the term of this patent is extended or adjusted under 35 U.S.C. 154(b) by 1243 days.

(21) Appl. No.: 12/107,491

(22) Filed: Apr. 22, 2008

(65) Prior Publication Data
US 2009/0264114 A1 Oct. 22, 2009

(51) Int. Cl.
H04B 1/00 (2006.01)
(52) U.S. Cl.
USPC ............................................ 381/119; 700/94
(58) Field of Classification Search
USPC ............................................ 381/119; 700/94
See application file for complete search history.

(56) References Cited

U.S. PATENT DOCUMENTS 6,430,535 B1 * 8/2002 Spille et al. ................... 704/500
2008/0004729 A1 1/2008 Hiipakka

FOREIGN PATENT DOCUMENTS

WO WO 2004/077884 A1 9/2004
WO WO 2007/003683 A1 1/2007

OTHER PUBLICATIONS

J. Merimaa et al.,*Spatial Impulse Response Rendering I: Analysis and Synthesis*, J. Audio Eng. Soc., vol. 53, No. 12, Dec. 2005, pp. 1115-1127.
V. Pulkki et al.,*Spatial Impulse Response Rendering II: Reproduction of Diffuse Sound and Listening Tests*, J. Audio Eng. Soc., vol. 54, No. ½, Jan.-Feb. 2006, pp. 3-20.
V. Pulkki et al.,*Spatial Impulse Response Rendering: Listening Tests and Applications to Continuous Sound*, Convention Paper 6371, Audio Engineering Society, May 2005,pp. 1-13.
V. Pulkki et al.,*Directional Audio Coding: Filterbank and STFT-based Design*, Convention Paper 6658, Audio Engineering Society, May 2006, pp.
V. Pulkki, *Directional Audio Coding in Spatial Sound reproduction and Stereo Upmixing*, AES 28th International Conference, Jun.-Jul. 2006, pp. 1-8.
V. C. Raykar et al.,*Position Calibration of Audio Sensors and Actuators in a Distributed Computing Platform*, Raykar Proceedings, ACM Multimedia 2003, Berkeley Nov. 2003,13 pages.
R. Lienhart et al.,*Self-Aware Distributed AV Sensor and Actuator Networks for Improved Media Adaptation*, 2004, IEEE International Conference on Multimedia and Expo (ICME),pp. 2131-2134.

* cited by examiner

*Primary Examiner* — Douglas Menz
(74) *Attorney, Agent, or Firm* — Alston & Bird LLP

(57) ABSTRACT

An apparatus for utilizing spatial information for audio signal enhancement in a multiple distributed network may include a processor. The processor may be configured to receive representations of a plurality of audio signals including at least one audio signal received at a first device and at least a second audio signal received at a second device. The first and second devices may be part of a common acoustic space network and may be arbitrarily positioned with respect to each other. The processor may be further configured to combine the first and second audio signals to form a composite audio signal, and provide for communication of the composite audio signal along with spatial information relating to a sound source of at least one of the plurality of audio signals to another device.

37 Claims, 15 Drawing Sheets

METHOD, APPARATUS AND COMPUTER PROGRAM PRODUCT FOR UTILIZING SPATIAL INFORMATION FOR AUDIO SIGNAL ENHANCEMENT IN A DISTRIBUTED NETWORK ENVIRONMENT

FIELD OF THE INVENTION

Embodiments of the present invention relate generally to the generation of a composite audio signal in a distributed network environment and, more particularly, relate to an apparatus, method and a computer program product for, in one exemplary embodiment, providing spatial information that may be decoupled from the provision of a mixed or composite audio signal in a multiple microphone environment in which at least some of the microphones are arbitrarily located.

BACKGROUND OF THE INVENTION

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. Such increased ease of information transfer and convenience to users has recently been accompanied by an increased ability to provide mobile communications at a relatively low cost. Accordingly, mobile communication devices are becoming ubiquitous in the modern world. With the rapid expansion of mobile communications technology, there has been a related rapid expansion in those services that are demanded and provided via mobile communication devices.

One area in which services have recently expanded relates to provision of various applications or software to users of electronic devices such as a mobile terminal. The applications or software may be executed from a local computer, a network server or other network device, or from the mobile terminal such as, for example, a mobile telephone, a mobile television, a mobile gaming system, etc, or even from a combination of the mobile terminal and the network device. In this regard, various applications and software have been developed and continue to be developed in order to give the users robust capabilities to perform tasks, communicate, obtain information or services, entertain themselves, etc. in either fixed or mobile environments.

One example of a service that may desirably be provided by modern communication networks relates to teleconferencing or the provision of conference calling. A conference call is a telephone call in which at least three parties participate. Teleconference systems are widely used to connect participants together for a conference call, independent of the physical locations of the participants. Teleconference calls are typically arranged in a centralized manner, but may also be arranged in alternate manners, such as in a distributed teleconference architecture as described further below.

Reference is now drawn to FIG. 1, which illustrates a schematic block diagram of a plurality of participants effectuating a centralized teleconference session via a conferencing switch 100. The illustration is representative of a traditional centralized teleconferencing system connecting participants 102, 104, 106 at several Sites A, B, and C, respectively, to a conference call, meaning that several locations are connected with one to n conference participants. The terminal or device at each site that corresponds to the participants 102, 104, 106 connects to the conference switch 100 as a stand-alone conference participant for the call. The conference switch 100, also referred to as a conference bridge, mixes incoming speech signals from each site and sends the mixed signal back to each site. The speech signal coming from the current site is usually removed from the mixed signal that is sent back to this same site.

Although techniques have been developed for effectuating conference sessions in numerous arrangements as indicated by the examples above, it may still be desirable to improve upon these existing techniques. Accordingly, it may be desirable to develop a mechanism that may overcome at least some of the disadvantages associated with the arrangements described above.

BRIEF SUMMARY OF THE INVENTION

A method, apparatus and computer program product are therefore provided that may enable generation of a composite audio signal in a multiple microphone or distributed network environment. In this regard, for example, in an environment in which the multiple microphones are arbitrarily located, a mechanism may be provided to utilize spatial information and also mix audio from the various microphones to provide a composite audio signal and an estimation of spatial information such as directional parameters indicative of from where the corresponding audio originated. As such, a distributed teleconference network with 3D teleconferencing may be provided. Some exemplary embodiments may provide for decoupling of spatial information from the provision of the mixed or composite audio signal, for example, by determining the spatial information from input received at a multi-microphone (MMic) (e.g., a microphone array including a plurality of microphones at fixed positions and typically close to each other (e.g., millimeters to centimeters apart)) setup while determining the composite audio signal by mixing audio from separate and potentially arbitrarily located devices. Alternatively, the spatial information may be determined from other than audio signals or even from data received from microphones arbitrarily positioned within a common acoustic space network. Accordingly, services such as teleconferencing may be provided in a manner that may deliver a more realistic representation of conference participants and/or improved speech quality as compared to conventional mechanisms.

In one exemplary embodiment, a method of utilizing spatial information for audio signal enhancement in a distributed network environment is provided. The method may include receiving representations of a plurality of audio signals including at least one audio signal received at a first device and at least a second audio signal received at a second device. The first and second devices may be part of a common acoustic space network and may be arbitrarily positioned with respect to each other. The method may further include combining the first and second audio signals to form a composite audio signal, and providing for communication of the composite audio signal along with spatial information relating to a sound source of at least one of the plurality of audio signals to another device.

In another exemplary embodiment, a computer program product for utilizing spatial information for audio signal enhancement in a distributed network environment is provided. The computer program product may include at least one computer-readable storage medium having computer-executable program code portions stored therein. The computer-executable program code portions may include a first program code portion, a second program code portion and a third program code portion. The first program code portion may be for receiving representations of a plurality of audio signals including at least one audio signal received at a first device and at least a second audio signal received at a second device. The first and second devices may be part of a common acoustic space network and may be arbitrarily positioned with respect to each other. The second program code portion may be for combining the first and second audio signals to form a composite audio signal. The third program code portion may be for providing for communication of the composite audio signal along with spatial information relating to a sound source of at least one of the plurality of audio signals to another device.

In another exemplary embodiment, an apparatus for utilizing spatial information for audio signal enhancement in a distributed network environment is provided. The apparatus may include a processor. The processor may be configured to receive representations of a plurality of audio signals including at least one audio signal received at a first device and at least a second audio signal received at a second device. The first and second devices may be part of a common acoustic space network and may be arbitrarily positioned with respect to each other. The processor may be further configured to combine the first and second audio signals to form a composite audio signal, and provide for communication of the composite audio signal along with spatial information indicative of a spatial parameter relating to a sound source of at least one of the plurality of audio signals to another device.

In another exemplary embodiment, an apparatus for utilizing spatial information for audio signal enhancement in a distributed network environment is provided. The apparatus includes means for receiving representations of a plurality of audio signals including at least one audio signal received at a first device and at least a second audio signal received at a second device. The first and second devices may be part of a common acoustic space network and may be arbitrarily positioned with respect to each other. The apparatus may further include means for combining the first and second audio signals to form a composite audio signal, and means for providing for communication of the composite audio signal along with spatial information relating to a sound source of at least one of the plurality of audio signals to another device.

In still another exemplary embodiment, a method of utilizing spatial information for audio signal enhancement in a distributed network environment is provided. The method may include receiving representations of a plurality of audio signals including at least a first audio signal received at a first device and at least a second audio signal received at a second device. The first and second devices may be part of a common acoustic space network and may be arbitrarily positioned with respect to each other. The method may further include dividing the first and second audio signals into two or more frequency bands and combining the first and second audio signals on each of the frequency bands separately to form a composite audio signal.

In another exemplary embodiment, a computer program product for utilizing spatial information for audio signal enhancement in a distributed network environment is provided. The computer program product may include at least one computer-readable storage medium having computer-executable program code portions stored therein. The computer-executable program code portions may include a first program code portion, a second program code portion and a third program code portion. The first program code portion may be for receiving representations of a plurality of audio signals including at least one audio signal received at a first device and at least a second audio signal received at a second device. The first and second devices may be part of a common acoustic space network and may be arbitrarily positioned with respect to each other. The second program code portion may be for dividing the first and second audio signals into two or more frequency bands. The third program code portion may be for combining the first and second audio signals on each of the frequency bands separately to form a composite audio signal.

In another exemplary embodiment, an apparatus for utilizing spatial information for audio signal enhancement in a distributed network environment is provided. The apparatus may include a processor. The processor may be configured to receive representations of a plurality of audio signals including at least one audio signal received at a first device and at least a second audio signal received at a second device. The first and second devices may be part of a common acoustic space network and may be arbitrarily positioned with respect to each other. The processor may be further configured to divide the first and second audio signals into two or more frequency bands and combine the first and second audio signals on each of the frequency bands separately to form a composite audio signal.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 12:
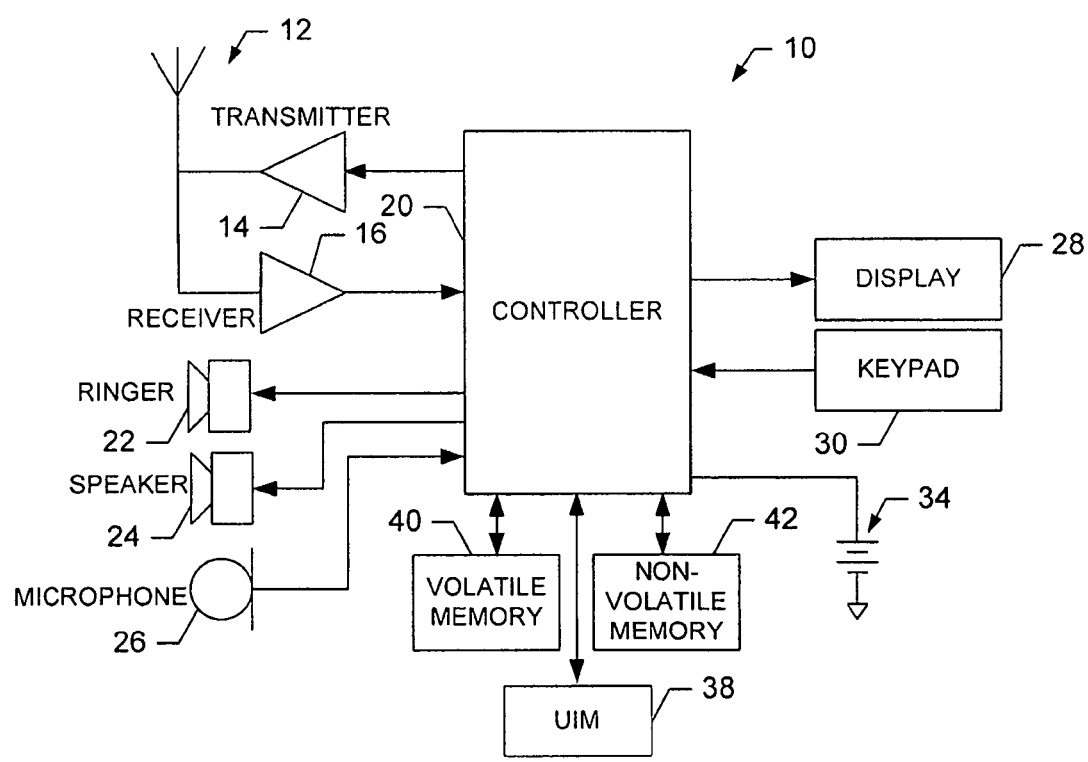
Figure 13:
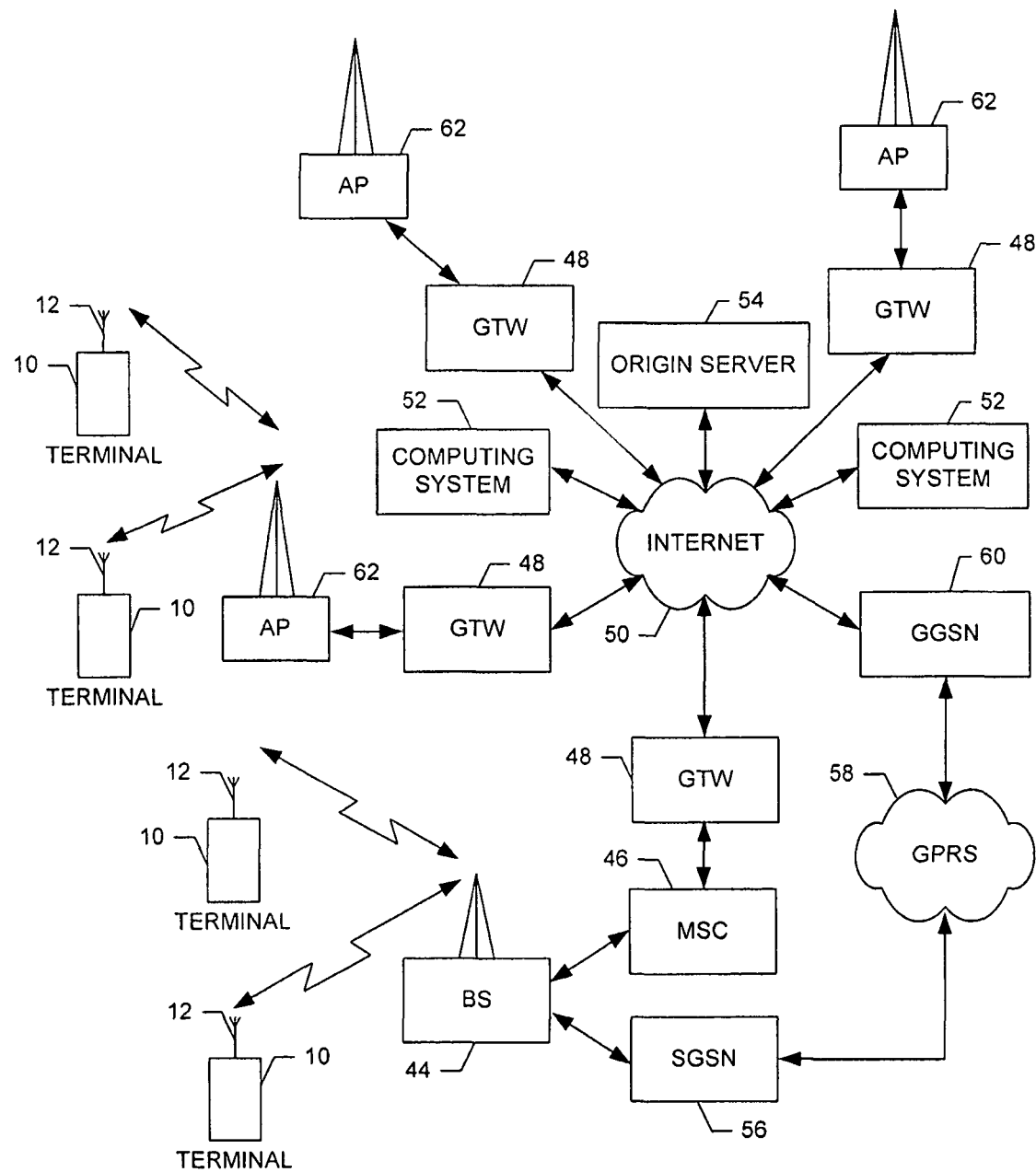
Figure 14:
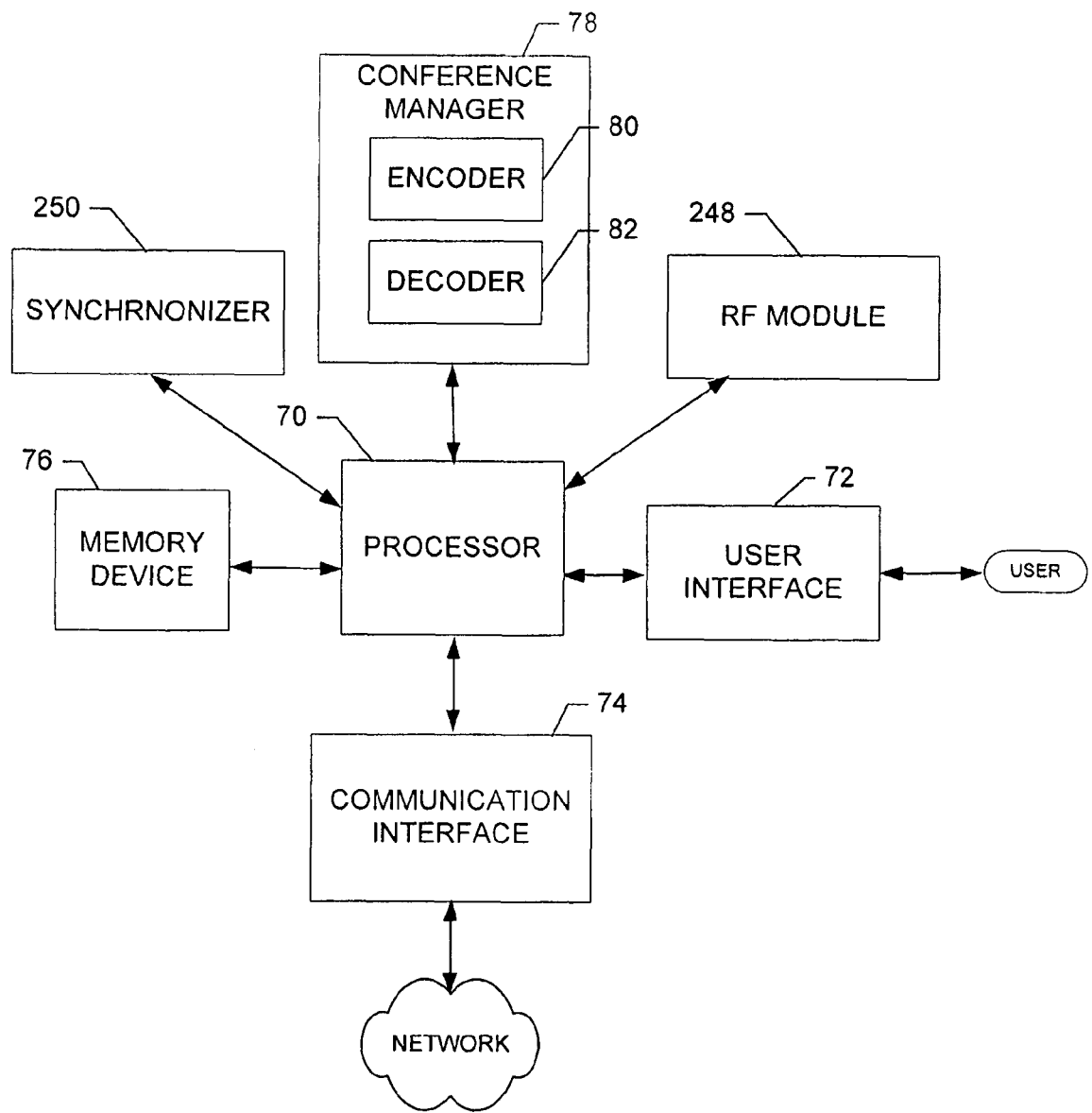
Figure 15:
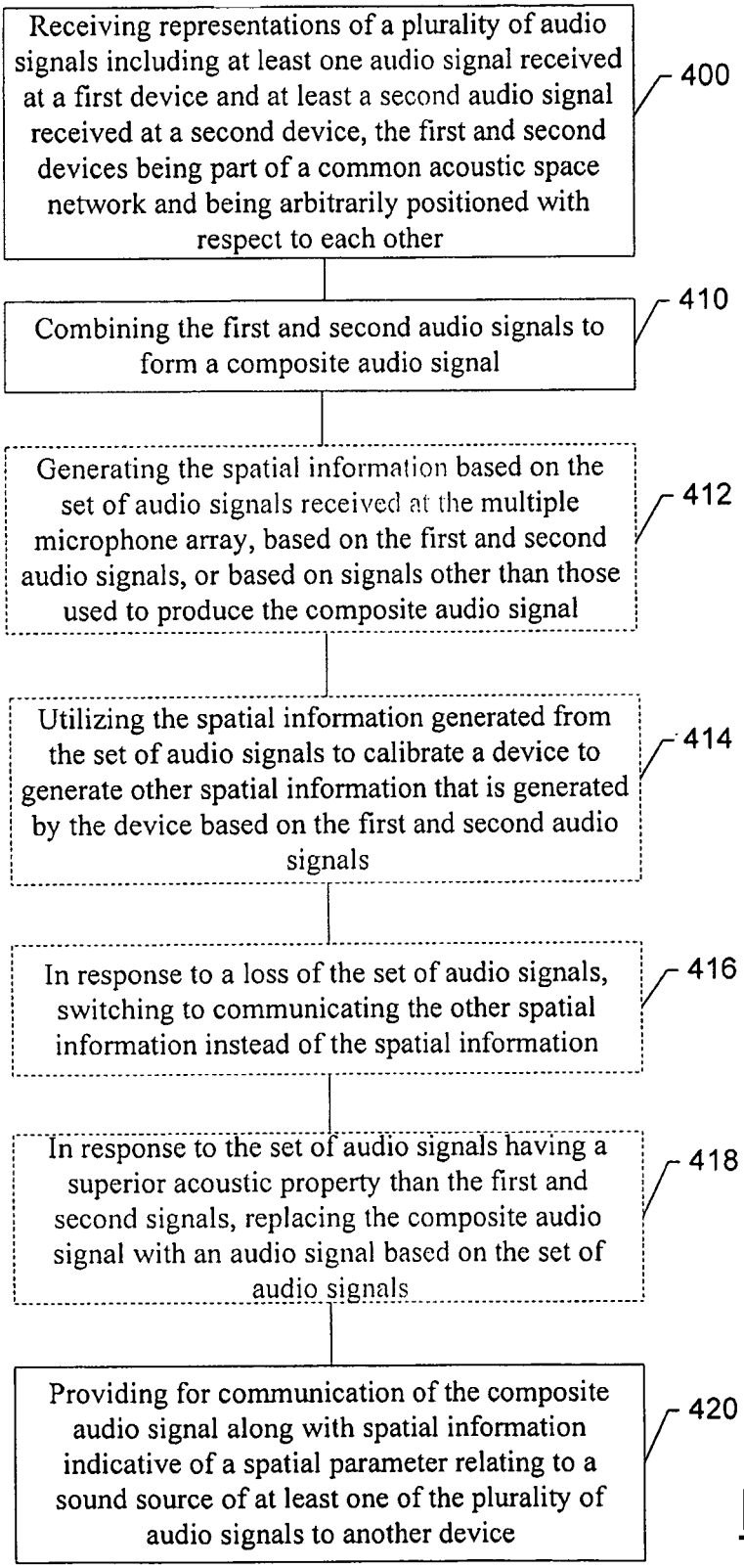
Figure 16:
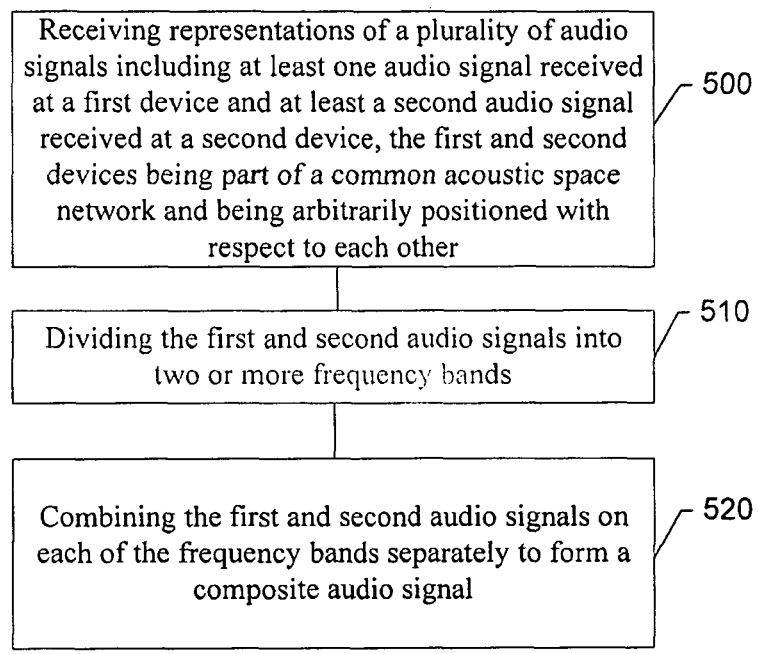

FIG. 12 a schematic block diagram of a mobile terminal according to an exemplary embodiment of the present invention;

FIG. 13 is a schematic block diagram of a wireless communications system according to an exemplary embodiment of the present invention;

FIG. 14 illustrates a block diagram showing an apparatus for utilizing spatial information for audio signal enhancement in a distributed network environment according to an exemplary embodiment of the present invention;

FIG. 15 is a flowchart according to an exemplary method of utilizing spatial information for audio signal enhancement in a distributed network environment according to an exemplary embodiment of the present invention; and FIG. 16 is a flowchart according to another exemplary method of utilizing spatial information for audio signal enhancement in a distributed network environment according to an exemplary embodiment of the present invention.

DETAILED DESCRIPTION OF THE INVENTION

Embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

Figure 1:
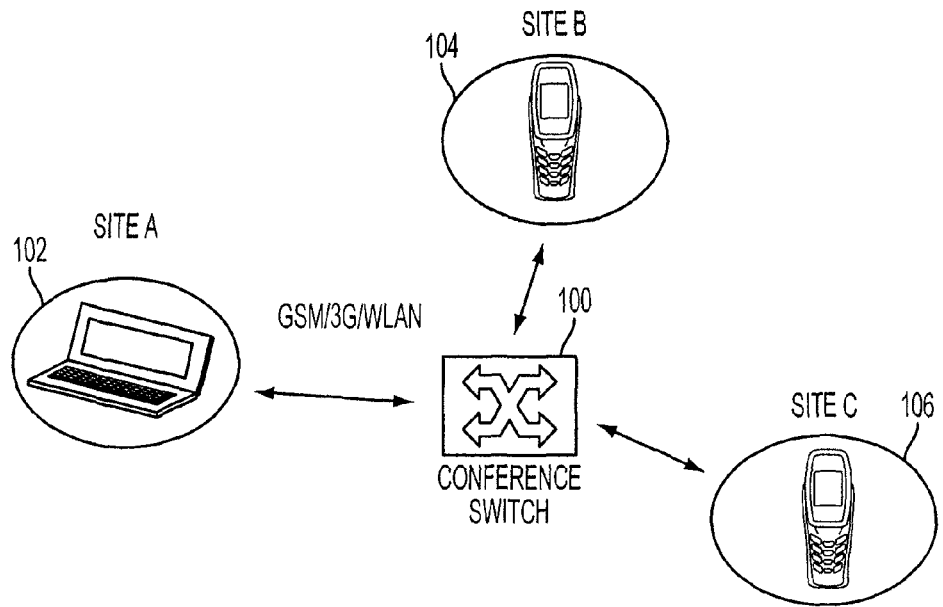
FIG. 1 is a schematic block diagram of a plurality of participants effectuating a centralized teleconference session via a conferencing switch.
Figure 2:
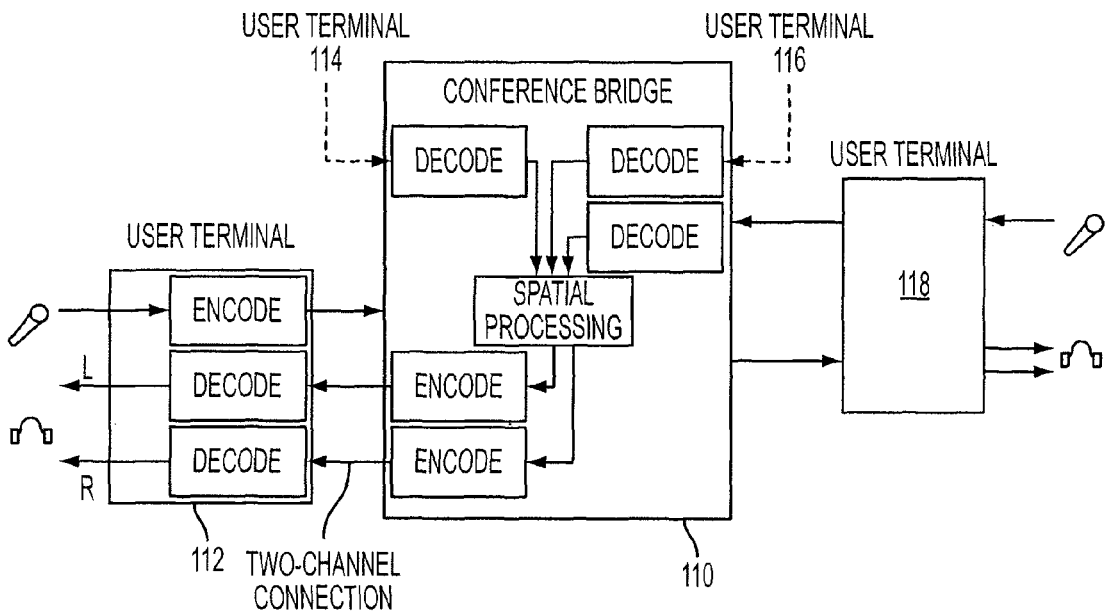
FIG. 2 is a functional block diagram of a centralized 3D conferencing system.

In addition to the system described above in reference to FIG. 1, another type of centralized teleconferencing system is a centralized 3D teleconferencing system. A typical centralized 3D teleconferencing system is shown in FIG. 2. A centralized three dimensional (3D) teleconferencing system may allow the use of spatial audio that provides noticeable advantages over monophonic teleconferencing systems. In a centralized 3D teleconferencing system, the speakers at or associated with participant terminals 112, 114, 116, 118 are presented as virtual sound sources that can be spatialized at different locations around the listener. 3D spatialization is typically achieved using head related transfer function (HRTF) filtering and including artificial room effect, although other examples of 3D processing include Wave field synthesis, Ambisonics, VBAP (Vector Base Amplitude Panning), SIRR (Spatial Impulse Response Rendering), DirAC (Directional Audio Coding), and BCC (Binaural Cue Coding). In a typical centralized 3D teleconferencing system, as shown in FIG. 2, monophonic speech signals from all participating terminals 112, 114, 116, 118 are processed in a conference bridge 110. For example, the processing may involve automatic gain control, active stream detection, mixing, and spatialization. The conference bridge 110 then transmits the 3D processed signals back to the terminals 112, 114, 116, 118. The stereo signals can be transmitted as two separately coded mono signals as shown with the user terminal 112 or as one stereo coded signal as shown with the user terminal 118.

Additional alternative implementations of 3D teleconferencing include concentrator and decentralized architectures. Another type of teleconference architecture is a distributed arrangement that involves a master device providing a connection interface to the conference call for one or more slave terminals. In a distributed teleconferencing architecture, one or more conference participants may be in a common acoustic space, such as one or more slave terminals connected to the conference call by a master device. The performance of a distributed system is typically limited, for example, because spatial separation during simultaneous speech is difficult due to a monophonic downlink connection.

Figure 3:
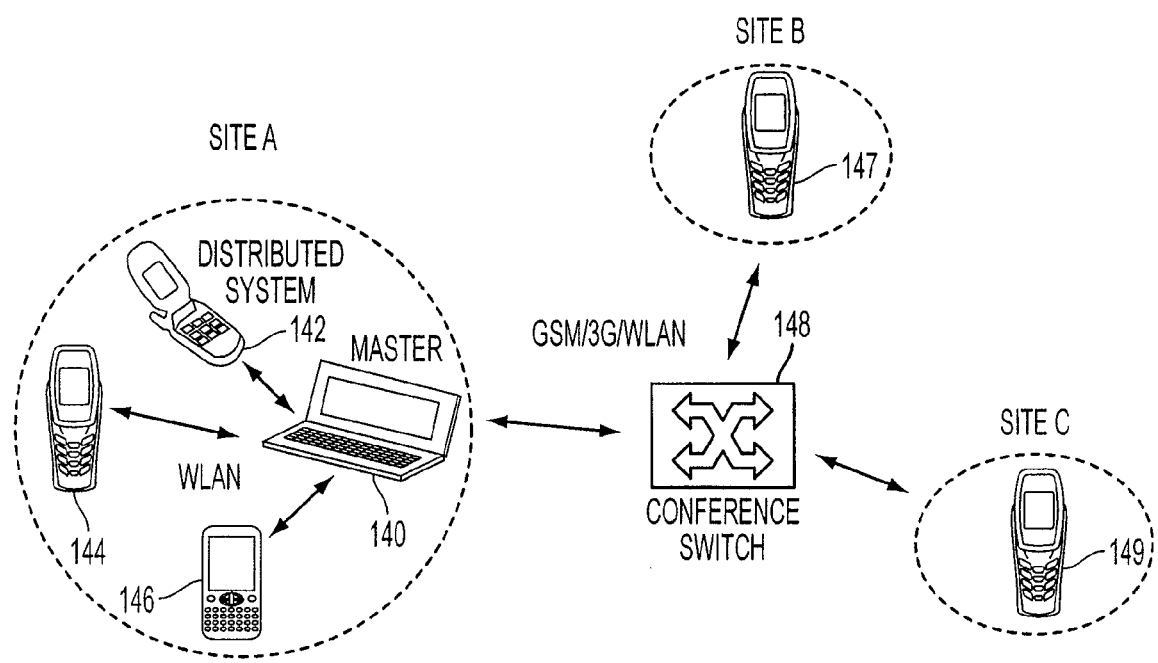
FIG. 3 is a schematic block diagram of a plurality of participants effectuating a distributed teleconference session, where the conference is effectuated via a conferencing switch and several participants are connected through a master terminal according to an exemplary embodiment of the present invention.

FIG. 3 is a schematic block diagram of a plurality of participants effectuating a distributed teleconference session, where the conference is effectuated via a conferencing switch and several participants are connected through a master terminal. In this regard, the participants that are connected through the master terminal may be in a common acoustic space, such as one or more slave terminals connected to the conference call by a master device 140. In an exemplary embodiment, this type of distributed arrangement of participants in a distributed teleconference session may be facilitated by a conference switch 148. Meanwhile, the several participants from the common acoustic space (site A) may participate in the conference via slave terminals 142, 144, 146 in communication with the master device 140.

The conference switch 148 may be configured to mix incoming speech signals from each site and sends the mixed signal back to each site, except that the speech signal coming from the current site may be removed from the mixed signal that is sent back to the current site. Furthermore, the master device 140 may be the only device from site A that may be in direct communication with the conference switch 148. As such, the slave terminals 142, 144, 146 may be in communication with the conference switch 148 via the master device 140. Meanwhile the conference switch 148 may also be in communication with one or more other remote devices (e.g., remote devices 147 and 149), which may be located at other sites (e.g., site B and site C). However, each of the remote sites could also include multiple devices arranged and networked in a similar manner to the devices at site A. In such a situation, one master device at each site may interface with the remaining slave devices at the respective site to provide a common uplink signal from the respective site to the conference switch 148. Meanwhile, the conference switch 148 may provide downlink audio to the master devices for further distribution to the slave terminals at their respective sites.

The concept of distributed teleconferencing, as the term is defined and used in the present application, refers to a teleconference architecture where at least some of the conference participants are co-located and participate in the conference session using individual slave terminals, such as using their own mobile devices and/or hands free headsets as their personal microphones and loudspeakers, connected through a master device, such as a mobile terminal of one of the conference participants acting as both a terminal for that conference participant and as the master device, or another computer device providing communication to all of the slave terminals, such as a personal or laptop computer or a dedicated conferencing device. In such instances, a common acoustic space network, such as a proximity network, can be established in accordance with any of a number of different communication techniques such as radio frequency (RF), Bluetooth (BT), Wibree, IrDA, and/or any of a number of different wireless and/or wireline networking techniques such as local area network (LAN), wireless LAN (WLAN), Worldwide Interoperability for Microwave Access (WiMAX) and/or ultra-wide band (UWB) techniques. For example, a WLAN ad hoc proximity network may be formed between the mobile devices (e.g., master device 140 and slave terminals 142, 144, 146) in a room while one of the devices (e.g., master device 140) acts as a master with respect to the slave devices. Communication may take place, for example, using a WLAN ad hoc profile or using a separate access point. The master device 140 connects to the conference switch 148 (or to another master device or, for example, directly to a remote participant (e.g., remote devices 147 or 149)), and the master device 140 receives microphone signals from all the other (slave) terminals 142, 144, 146 site A, and also the microphone signal from the master device 140 itself (e.g., if the master device 140 is acting as a participant terminal for the conference call).

In an exemplary embodiment, in order to facilitate effectuation of a conference session for the participants in the proximity network, the master device 140 may be capable of operating a mixer with corresponding uplink encoders and decoders and corresponding downlink encoders and decoders. The mixer may comprise software operable by a respective network entity (e.g., master device 140), or may alternatively comprise firmware and/or hardware. Also, although the mixer may typically be co-located at the master device of a common acoustic space network, the mixer can alternatively be remote from the master device, such as within a conferencing switch. The master device 140 may employ a mixing algorithm for the mixer that generates a combined uplink signal (e.g., a composite audio signal) from all of the individual slave terminal microphone signals. Depending upon the mixing algorithm used by the master device, the uplink signal may be an enhanced uplink signal. At the downlink direction, the master device 140 may receive speech signals from the teleconference connection and share the received speech signals with the other (slave) terminals, such as to be reproduced by the loudspeakers of the all terminals at site A. Using this type of distributed teleconferencing, speech quality at the far-end side may be improved, for example, because microphones are proximate the participants. At the near-end side, less listening effort may be required from the listener when multiple loudspeakers are used to reproduce the speech.

During a distributed conferencing session, the participants of the conference session, including those within respective common acoustic space network(s), can exchange voice communication in a number of different manners. For example, at least some, if not all, of the participants of a common acoustic space network can exchange voice communication with the other participants independent of the respective common acoustic space network but via one of the participants (e.g., the master device) or via another entity in communication with the participants, as may be the case when the device of one of the participants or another device within the common acoustic space network is capable of functioning as a speakerphone. Also, for example, at least some, if not all, of the participants of a common acoustic space network can exchange voice communication with other participants via the common acoustic space network and one of the participants (e.g., the master device) or another entity within the common acoustic space network and in communication with the participants, such as in the same manner as the participants exchange data communication. In another example, at least some of the participants within a common acoustic space network can exchange voice communication with the other participants independent of the common acoustic space network and any of the participants (e.g., the master device) or another entity in communication with the participants. It should be understood, then, that although the participants may be shown and described with respect to the exchange of data during a conference session, those participants typically may also exchange voice communication in any of a number of different manners.

According to exemplary embodiments of the present invention, a device in FIG. 3 (e.g., the master device 140 or the conference switch 148) may be enabled to combine monophonic data input at each of the devices at a particular site (e.g., the master device 140 and the slave terminals 142, 144, 146) to provide a single uplink audio signal (e.g., mixed audio or a composite audio signal) for communication to the other participants in a conference call (e.g., remote devices 147 or 149), while also providing for a determination of spatial indicia for use in providing a potential for the delivery of 3D audio based on the monophonic data initially received. However, the device need not be limited to combining only monophonic data. In this regard, although a specific example will be described below in the context of combining or mixing monophonic data, it should be understood that combining or mixing may also be performed with respect to data that is not monophonic. As such, combining or mixing data as described herein may not only relate to mono-mixing (e.g., N audio input signals mixed to one output signal), but may also relate to "multi-mixing" (e.g., N input signals mixed to K output signals). Thus, the terms "combining" or "mixing" as used herein, may also include the possibility of selecting K signals from N signals and communicating the K signal bundle further. Accordingly, the terms "combine" or "mix" as used herein may refer to computing an average or weighted average of inputs provided in order to generate an output (e.g., a combination of channels comprising a computation of the average or a weighted average of the channels) or otherwise selecting one or more of a plurality of inputs as the output.

One exemplary mechanism for providing a device capable of delivering both spatial information and mixed audio from a distributed network may include a multi-microphone capable device. A multi-microphone or MMic may be an array of microphones or transducers that are spaced apart from each other by a predetermined distance. In most cases, the MMic includes microphones that are relatively close to each other. The known or predetermined distance provided between each microphone enables beamforming using time delays associated with sound arrival at each microphone such that sound received at the MMic may be determined to be associated with a particular beam oriented in a corresponding particular direction. Thus, for a given sound, the MMic may be able to determine from which direction the sound originated or at least from which direction relative to the device employing the MMic the sound reached the device.

In an exemplary embodiment, a MMic at one device (e.g., one of the master device 140 or the slave terminals 142, 144, 146) at a particular site may be utilized for determinations regarding spatial information while the same or another device (e.g., the master device 140) may mix input audio from the devices at the particular site. Thus, embodiments of the present invention may decouple mixing or combining of signals to form an uplink audio signal from the estimation of spatial information. The spatial information may include directional parameters (bearing or direction, azimuth, elevation, etc.) and or other information descriptive of an input audio signal (e.g., distance, diffuseness, signal-to-noise ratio, etc.).

Figure 4:
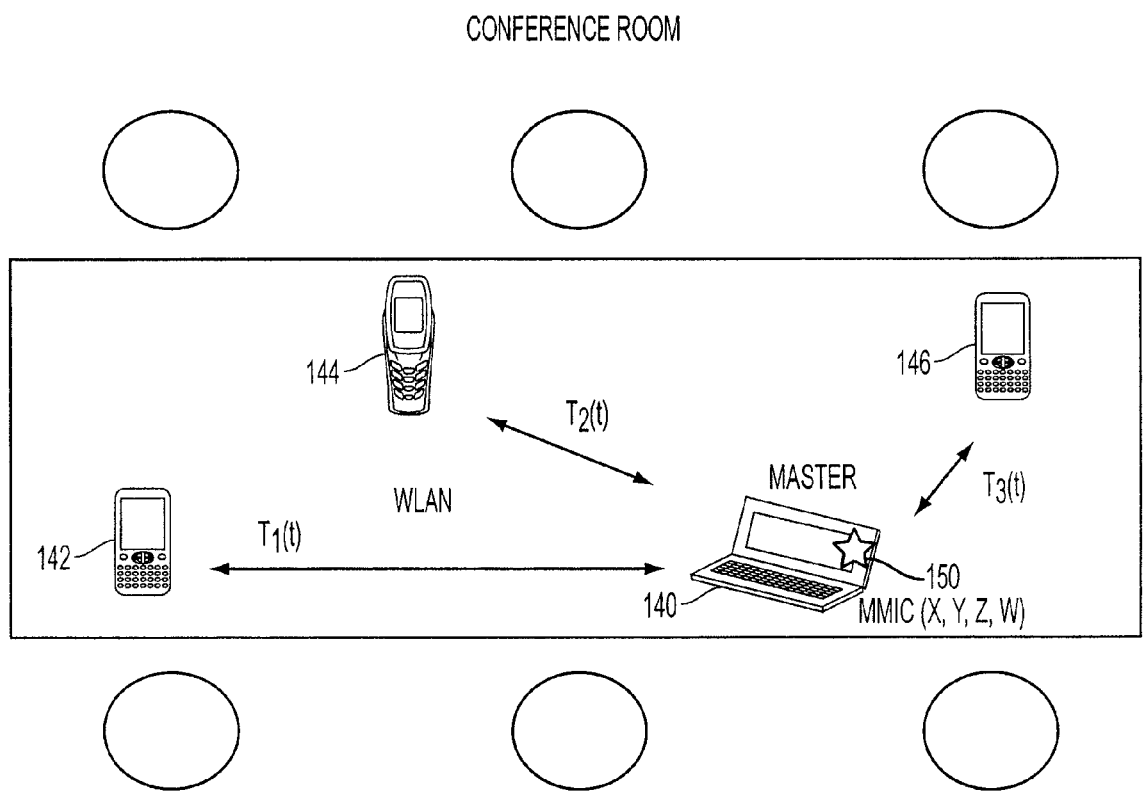
FIG. 4 illustrates a schematic block diagram of an example in which a plurality of participants may participate in a distributed teleconference session in which a master device includes a MMic according to an exemplary embodiment of the present invention.

FIG. 4 illustrates a schematic block diagram of an example in which a plurality of participants may participate in a distributed teleconference session in which a master device includes a MMic according to one exemplary embodiment. As shown in FIG. 4, the master device 140 may include a MMic 150. The master device 140 and the slave terminals 142, 144, 146 may be distributed in a random manner such as being placed generally near an individual participant (e.g., indicated by the circle shapes distributed around a conference table in a conference room) associated with the respective devices. In this exemplary embodiment, the master device 140 may be configured to receive (e.g., via a WLAN connection) monophonic audio signals (e.g., $T_1(t), T_2(t), T_3(t)$) from each of the slave terminals 142, 144, 146 and combine or mix the signals into a downmixed signal (e.g., a composite audio signal) for communication to the conference switch 148. Meanwhile, the MMic 150 may be configured to receive, at the master device 140 in this example, signals W(t), X(t), Y(t) and Z(t) from respective microphones of the MMic 150. Although four signals are shown in this example, either more or less MMic microphone signals are possible. The signals W(t), X(t), Y(t) and Z(t) may be used to provide the spatial information as described in greater detail below such as, for example, in reference to FIGS. 6 and 7.

Figure 5:
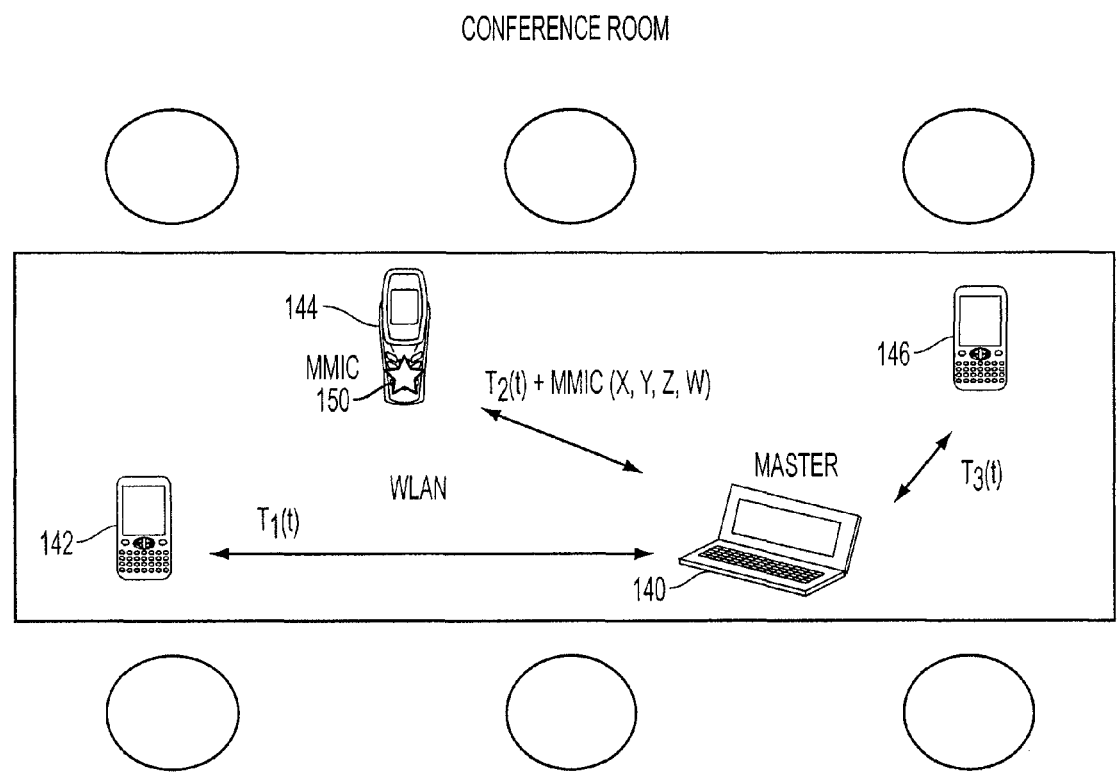
FIG. 5 illustrates a schematic block diagram of an example in which a plurality of participants may participate in a distributed teleconference session in which a slave terminal includes a MMic according to an exemplary embodiment of the present invention.

FIG. 5 illustrates a schematic block diagram of an example in which a plurality of participants may participate in a distributed teleconference session in which a slave terminal includes a MMic according to one exemplary embodiment. Although FIG. 4 shows an embodiment where the master device 140 includes the MMic 150, this configuration is merely exemplary and the MMic 150 could be disposed at one of the slave terminals (or even at another device entirely). As such, in FIG. 5, one of the slave terminals (e.g., slave terminal 144) includes the MMic 150. As was the case also in the exemplary embodiment of FIG. 4, the master device 140 and the slave terminals 142, 144, 146 may be distributed in a random manner such as being placed generally near an individual participant associated with the respective devices. In this exemplary embodiment, the master device 140 may be configured to receive (e.g., via a WLAN connection) monophonic audio signals (e.g., $T_1(t), T_2(t), T_3(t)$) from each of the slave terminals 142, 144, 146 and combine the signals into a downmixed signal for communication to the conference switch 148. Meanwhile, the MMic 150 may be configured to receive, at the slave terminal 144 in this example, signals W(t), X(t), Y(t) and Z(t) from respective microphones of the MMic 150. The signals W(t), X(t), Y(t) and Z(t) may be used to provide the spatial information as described in greater detail below such as, for example, in reference to FIGS. 6 and 7. The spatial information may be determined by the slave terminal 144 and communicated to the master device 140 or the signals W(t), X(t), Y(t) and Z(t) may be directly communicated to the master device 140 to enable the master device 140 to determine the spatial information.

Spatial information may be determined in a variety of ways and may include various different aspects. For example, spatial information may include information regarding direction (e.g., the direction from which a sound is detected), diffuseness, distance (e.g., distance between a speaker and a microphone), and other spatially related parameters. Two specific non-limiting examples of mechanisms by which spatial information may be determined may include Spatial Impulse Response Rendering (SIRR) and Directional Audio Coding (DirAC).

Figure 6:
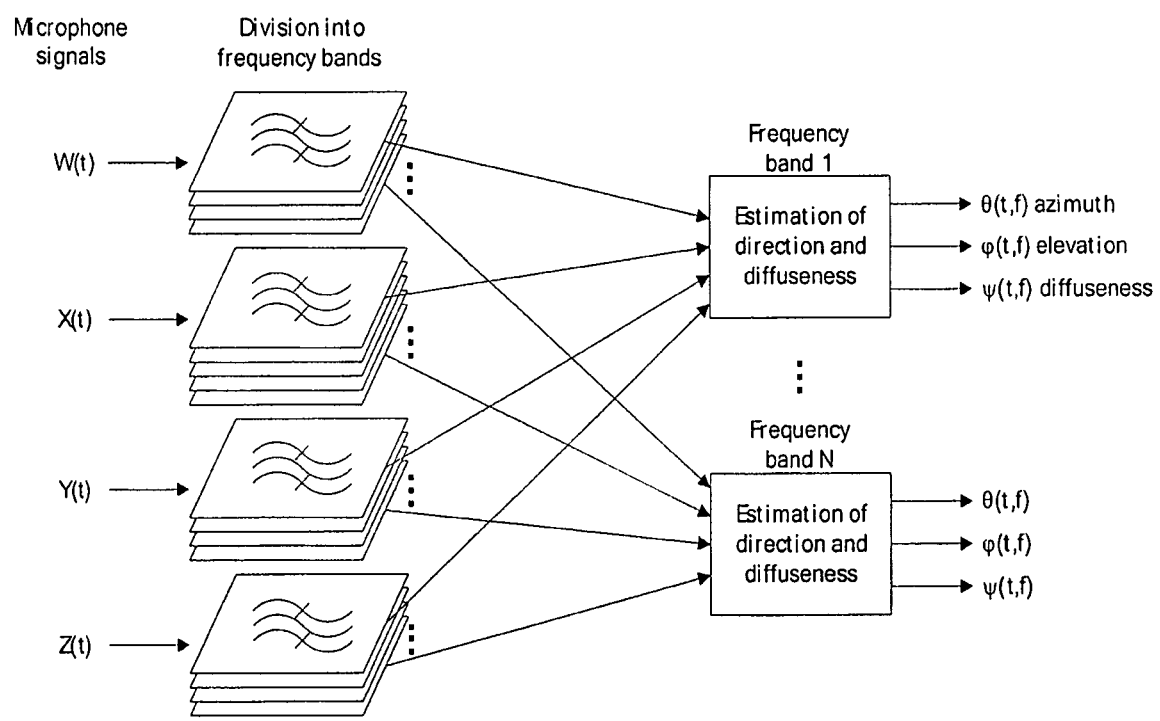
FIG. 6 shows a DirAC analysis phase on a conceptual level according to an exemplary embodiment of the present invention.
Figure 7:
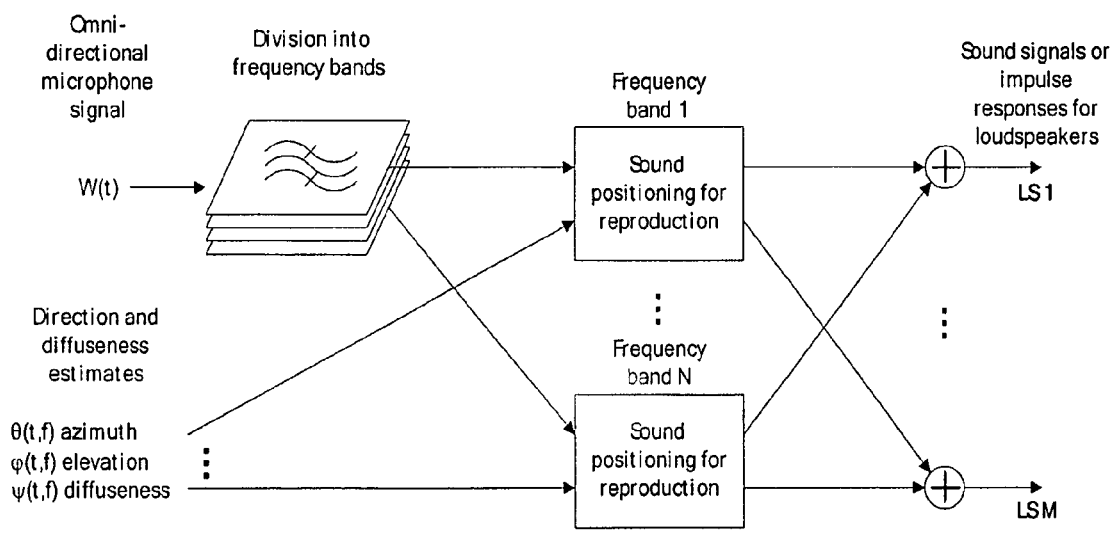
FIG. 7 shows DirAC reproduction according to an exemplary embodiment of the present invention.

Meanwhile, the DirAC technique may be used to analyze the output of a spatial microphone system by dividing the input signals into frequency bands (or channels) and estimating the direction-of-arrival and the diffuseness individually for each time instance and frequency band. FIG. 6 shows a DirAC analysis phase on a conceptual level. In this regard, signals from various microphones (e.g., signals W(t), X(t), Y(t) and Z(t)) may each be broken into frequency bands. Estimations of direction and diffuseness may then be used for each corresponding band from the respective different signals to get spatial information including azimuth, elevation and diffuseness. DirAC reproduction, as shown in FIG. 7, may be based on taking a signal recorded by an omni-directional microphone, and distributing the signal according to the direction and diffuseness estimates gathered in the analysis phase. One positive aspect of the DirAC technique may be that it is possible to generalize the system in a way that makes it possible to use the same representation for the soundfield and use an arbitrary loudspeaker (or transducer, in general) setup in reproduction. This is due to the fact that the sound field is coded in parameters that are fully independent of the actual transducer setup used for reproduction, namely direction of arrival angles (azimuth, elevation) and diffuseness.

Figure 8:
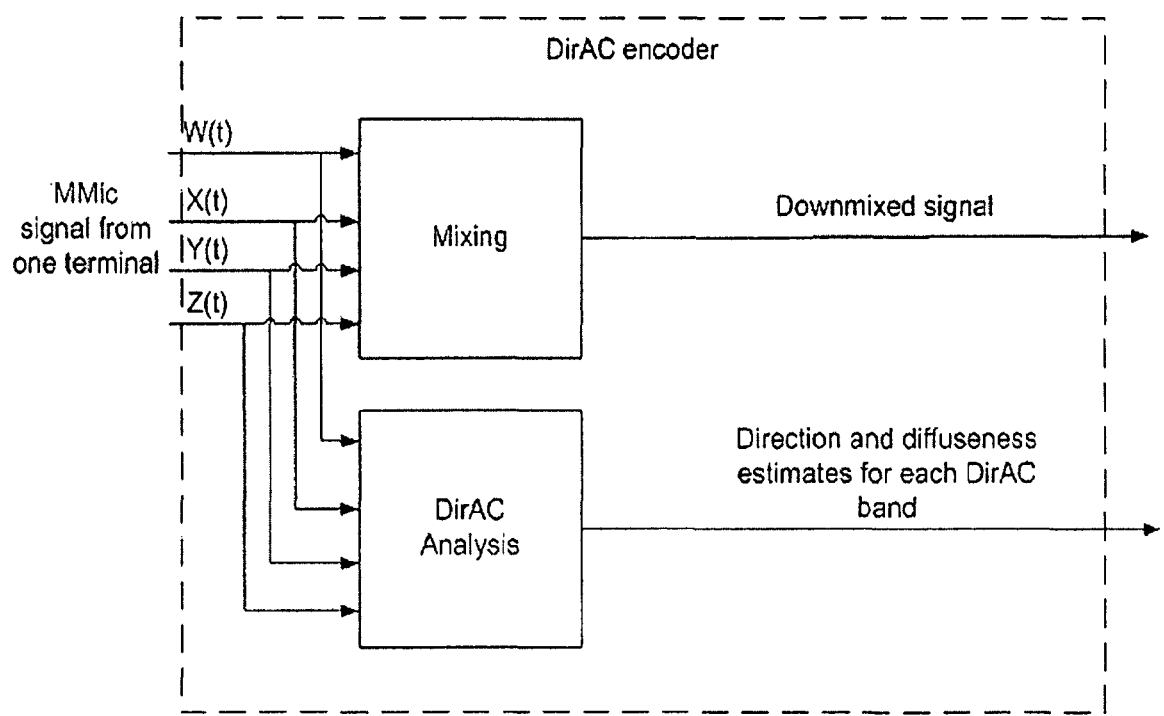
FIG. 8 illustrates a block diagram of a DirAC encoder providing both a downmixed signal and direction and diffuseness estimates for each DirAC band.

A few examples of encoders for employment in providing a mixed uplink signal from distributed microphones and also providing spatial information will now be described in relation to DirAC encoding. However, is should be understood that other encoding techniques (e.g., SIRR, Binaural Cue Coding (BCC) or the like) could alternatively be employed and DirAC encoding is merely being shown hereinafter for exemplary purposes. As such, a DirAC encoder providing both a downmixed signal and direction and diffuseness estimates for each DirAC band is shown in FIG. 8. In the example of FIG. 8, signals (e.g., signals W(t), X(t), Y(t) and Z(t)) from an array of microphones having a fixed or known spatial arrangement (e.g., a MMic) may be used both for mixing and spatial information determination. The architecture employed to provide encoding according to the embodiment of FIG. 8 would not be distributed. However, since in some environments a distributed conferencing architecture may be desirable or even preferred, embodiments of the present invention provide for the provision of distributed conferencing while still enabling 3D conferencing via the provision of spatial information.

Figure 9:
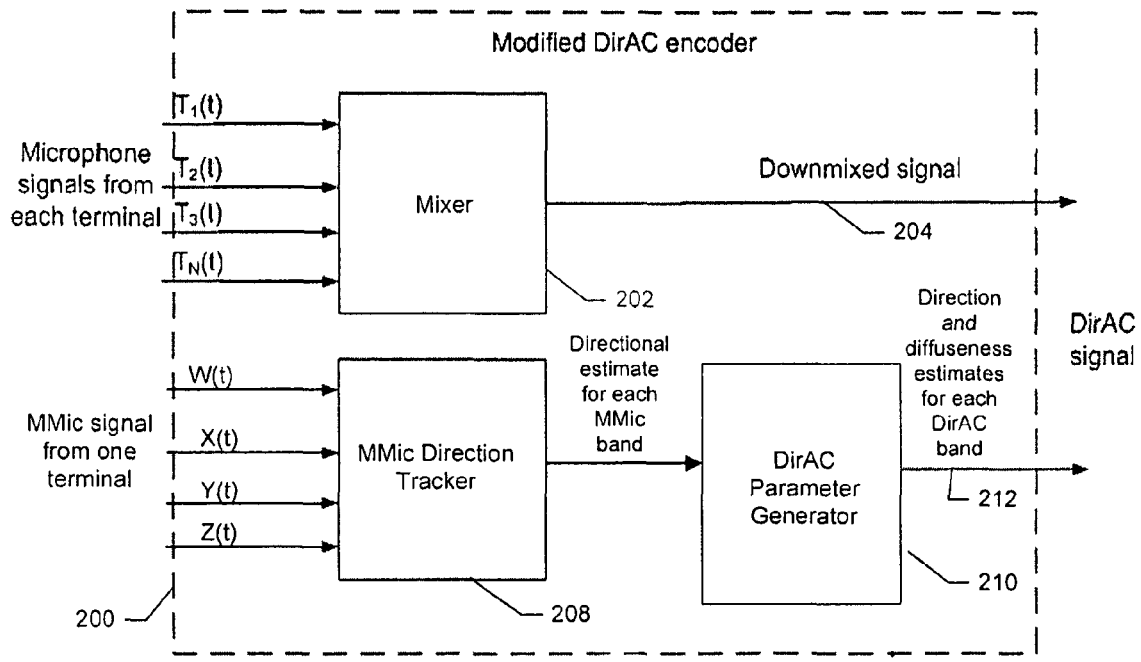
FIG. 9 illustrates a block diagram of modified DirAC encoder using a multi-microphone according to an exemplary embodiment of the present invention.

FIG. 9 illustrates a block diagram of a modified DirAC encoder using a multi-microphone according to an exemplary embodiment of the present invention. In this regard, as shown in FIG. 9, which illustrates an exemplary embodiment of an encoder that may be employed on the master device 140, a modified encoder 200 may be configured to receive microphone signals (e.g., $T_1(t), T_2(t), T_3(t) \ldots T_N(t)$). The signals may then be mixed by a mixer 202 to produce a downmixed signal 204 which may be provided, for example, to the conference switch 148. The mixer 202 may be any means or device embodied in hardware, software or a combination of hardware and software that is configured to mix input signals in order to provide a mixed or combined output signal.

In an exemplary embodiment, the mixer 202 may employ a dynamic mixing algorithm. The dynamic mixing algorithm may enable calculation of various audio features for the microphone signals $T_1(t), T_2(t), T_3(t) \ldots T_N(t)$ and, based on these features, the dynamic mixing algorithm may attempt to mix signal(s) from microphone(s) that have (or typically have) the highest energy or best signal-to-noise ratio as compared to other signals. As such, for example, the mixer 202 (e.g., via the dynamic mixing algorithm) may be configured to select one of the microphone signals $T_1(t), T_2(t), T_3(t) \ldots T_N(t)$ at any given time for inclusion as the downmixed signal 204 on the basis of which one of the signals has better properties than the other signals. Thus, in some examples, if a speaker (e.g., a speaking person) is picked up on more than one microphone among the devices in a room, the microphone closest to the speaker (or at least having the best audio properties) may be selected as the signal to be included in the downmixed signal 204. As an example, if one slave terminal 142 is closest to a speaker, but the other slave terminals 144 and 146 and/or the master device 140 also picks up the speaker, the mixer 202 may select the signal from the slave terminal 142 closest to the speaker for inclusion in the downmixed signal 204.

In some embodiments, an output from the dynamic mixing algorithm may be a monophonic signal. However, the combined signal may also include more than one audio channel, e.g., for enhanced quality or compatibility with existing audio decoders. The mixing algorithm can also be modified to support band-wise mixing, so that mixing can be done separately for several frequency bands, to thereby provide an advantage when simultaneous speech is present in the conference room by enabling simultaneous speakers to both have their respective signals (e.g. emphasizing frequency bands that have highest temporal energy or best SNR) included in the downmixed signal 204 based on selection of the corresponding best signal received from each speaker.

Figure 10:
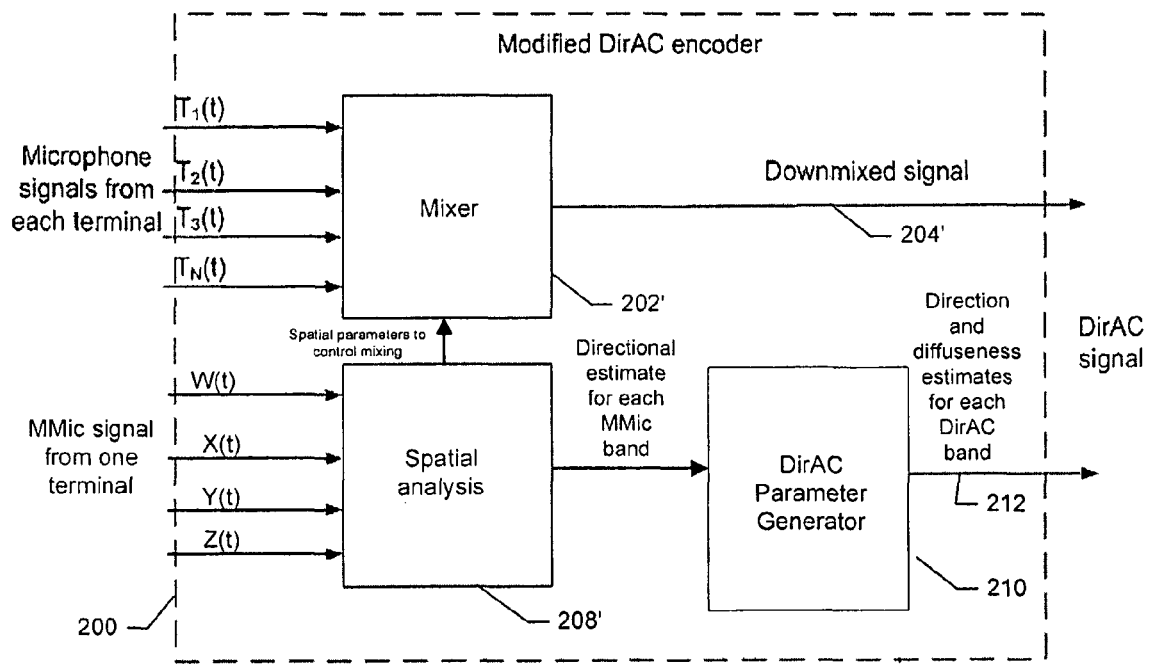
FIG. 10 illustrates a block diagram of modified DirAC encoder using a multi-microphone and incorporating spatial parameters into band-wise mixing according to an exemplary embodiment of the present invention.

In an exemplary case employing DirAC (e.g., via a DirAC analyzer) or another spatial analysis method, the mixing algorithm can be modified to take into account the spatial parameters provided by the analyzer. This provides the mixing algorithm the possibility to react to changes in the acoustic environment. The algorithm may, e.g., choose to attenuated frequency bands with a high value of the diffuseness coefficient, which may lead to improved intelligibility. FIG. 10 shows an a block diagram of a modified DirAC encoder using a multi-microphone according to an exemplary embodiment of the present invention in which spatial parameters are used to control mixing in the mixer 202'. As such, the embodiment of FIG. 10 supports band-wise mixing. As shown in FIG. 10, spatial analysis may be performed at device 208', which may be substantially similar to MMic direction tracker 208 except that spatial parameters are provided to the mixer 202' to control mixing. Thus, an output of the mixer 202' may be a downmixed signal 204' that has been band-wise mixed.

In an exemplary embodiment, as shown in FIG. 9, a spatial tracker (e.g., MMic direction tracker 208) may be employed to receive input audio signals (e.g., signals W(t), X(t), Y(t) and Z(t)) from an array of spatially fixed or known microphones (e.g., a MMic). The spatial tracker may be configured to provide spatial information for each band of the input signal (e.g., each MMic band). In some embodiments, the spatial tracker may be in communication with a spatial parameter generator (e.g., DirAC parameter generator 210), which may be configured to generate spatial information 212 for each DirAC band. The spatial tracker, spatial parameter generator and the DirAC analyzer may each be any device or means embodied in hardware, software or a combination of hardware and software that is configured to perform the corresponding functions of the respective devices as described herein. The downmixed signal 204 and the spatial information 212 may be included in a DirAC signal communicated to the conference switch 148. As such, for example, the exemplary embodiment of FIG. 9 may decouple the generation of the downmixed signal 204 from the generation of the spatial information 212. In particular, the exemplary embodiment of FIG. 9 is illustrative of an embodiment in which spatial parameters may be provided from a source other than from the signals used to generate the downmixed audio signal.

Although FIG. 9 illustrates an example in which the downmixed audio signal (e.g., the downmixed signal 204) is generated from monophonic signals received from microphones at each respective device (e.g., the master device 140 and the slave terminals 142, 144, 146), in one exemplary embodiment, the master device 140 may elect to utilize MMic data for the downmixed signal 204 if the MMic data is better than the signal data from any of the devices (e.g., if the MMic data has a higher signal-to-noise ratio).

In an exemplary embodiment, if there are several MMic capable terminals in the distributed system, the master device 140 may be enabled to select which of the MMic capable terminals works as a direction tracker or producer of the spatial information. If the selected terminal disconnects from the system for any reason, spatial information generation or direction tracking may be accomplished in some other MMic terminal selected by the master device 140. In another exemplary embodiment, if there are multiple MMic capable terminals, the master device 140 may receive inputs from multiple MMic terminals in order to track the source location(s) using information received from the multiple MMic terminals and the master device 140 may generate a combined location estimate based on the multiple received inputs. If source locations are available from the analysis, a set of parameters may be generated which could be extended to include other values such as, for example, source distance. Embodiments may also incorporate devices having enhanced reproduction capabilities with respect to rendering improved spatial information. In this regard, for example, level differences and artificial reverberation could be used to convey source distance. A more complex reproduction system might use, e.g., wave-field synthesis to render the source positions more accurately.

According to an exemplary embodiment employing a MMic for spatial information determinations, spatial information such as a direction estimate may be calculated for multiple frequency bands at the same time. In a case where there is one active sound source, the direction estimate may typically be the same for all frequency bands. When there are several sound sources, (e.g., due to simultaneous speech in a room), the direction estimates for different bands can be different so that it may be possible to encode simultaneous sources as well.

Figure 11:
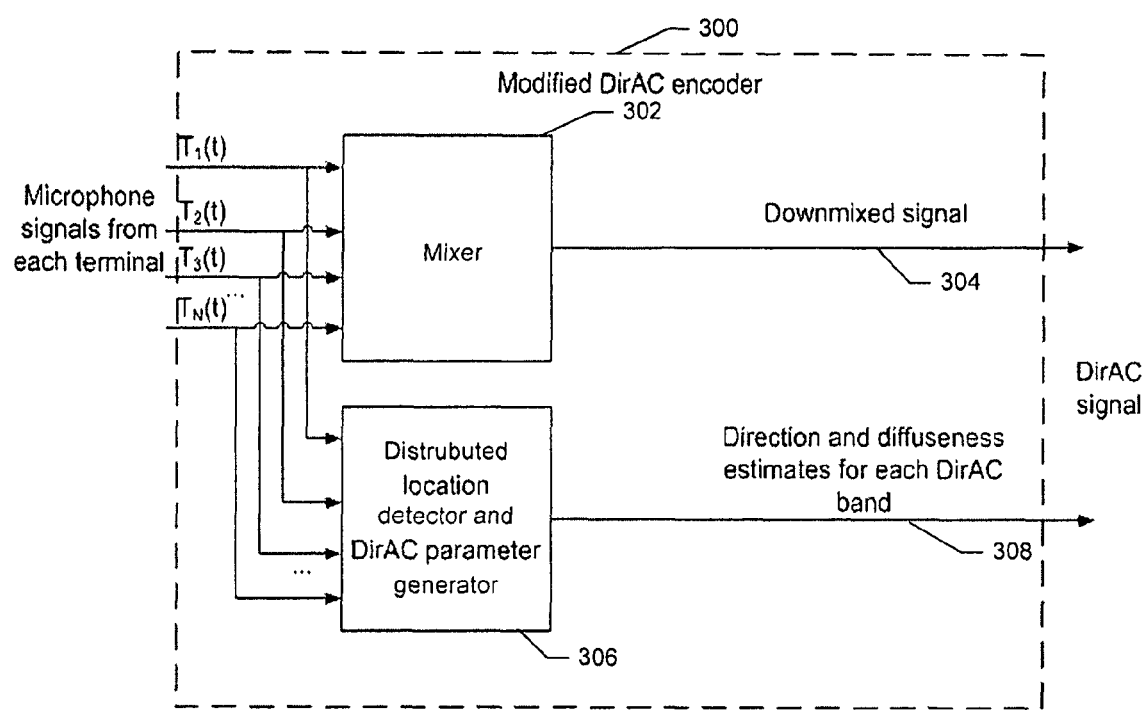
FIG. 11 illustrates a block diagram of modified DirAC encoder without a multi-microphone according to an exemplary embodiment of the present invention.

Although FIG. 9 illustrates an example in which spatial parameters may be provided from a source other than from the signals used to generate the downmixed audio signal, other variations are possible. In an exemplary embodiment, as shown in the example of FIG. 11, spatial parameters may be provided from the same signals used to generate the downmixed audio signal. As such, the exemplary embodiment of FIG. 11 may provide both the downmixed audio signal and the spatial information from audio signals generated by individual microphones (i.e., not MMics) arbitrarily located within an acoustic space. In this regard, for example, an encoder 300 according to another exemplary embodiment may include a mixer 302 configured to generate a downmixed signal 304 and a distributed spatial information determiner (e.g., distributed location detector and DirAC parameter generator 306) configured to generate spatial information 308. The mixer 302 and the distributed location detector and DirAC parameter generator 306 may each be any device or means embodied in hardware, software or a combination of hardware and software that is configured to perform the corresponding functions of the respective devices as described in greater detail below. In this regard, the mixer 302 may employ a mixing algorithm as described above for providing the downmixed signal 304 based on input signals (e.g., $T_1(t)$, $T_2(t)$, $T_3(t) \ldots T_N(t)$) from microphones at each of various devices in an acoustic space or room.

Meanwhile, the distributed location detector and DirAC parameter generator 306 may be configured to determine spatial information also based on input signals (e.g., $T_1(t)$, $T_2(t)$, $T_3(t) \ldots T_N(t)$) from microphones at each of various devices in an acoustic space or room. In other words, the distributed location detector and DirAC parameter generator 306 may be configured to provide distributed location detection. As such, the distributed location detector and DirAC parameter generator 306 may be configured to utilize microphone signals $T_1(t), T_2(t), T_3(t) \ldots T_N(t)$ from arbitrarily positioned terminals in an acoustic space are analysed and spatial information such as, for example, location information related to an active talker(s) may be detected in the master device 140 (or the conference switch 148). In some instances, distributed location detection of spatial information may be affected by possible latency variation between individual terminals. Accordingly, unless the master device 140 accounts for this scenario (e.g., via a synchronization mechanism) time delay of arrival based analysis may become unreliable. As such, a synchronizer 250 may be employed as described in reference to FIG. 14 below. An advantage of distributed spatial information detection (e.g., distributed location detection) may be that there is no need for a MMic terminal to participate in the system.

In some embodiments, switching between distributed spatial information detection and MMic-spatial information tracking or detection may be desirable. For example, if a MMic capable terminal is in a distributed network, an embodiment of the present invention may initially, as directed by the master device 140, operate in accordance with the example of FIG. 9 by utilizing the MMic to obtain spatial information while utilizing arbitrarily distributed microphones for obtaining the signals for mixing to produce the audio for uplink. Meanwhile, for example, if there were only one MMic terminal in the distributed network and the MMic terminal is disconnected from the system, the master device 140 may shift to distributed spatial information determination. As such, in an exemplary embodiment, a MMic terminal can be used as a primary spatial information tracker and a distributed algorithm for distributed spatial information determination may be utilized as a backup. Some embodiments, may further employ an adapter or adaptation algorithm comprising any means or device embodied in hardware, software or a combination of hardware and software that is configured to train the master device 140 (e.g., via training the spatial information determiner or distributed location detector and DirAC parameter generator 306) using MMic data to enable more accurate provision of spatial information in the absence of the MMic data. Thus, when the master device 140 receives a direction estimate from a MMic tracker (mounted in slave or master) it may also use the direction estimate to calibrate a distributed tracking algorithm in realtime.

In some embodiments, the decoupling between the generation of the audio signal forming the uplink audio signal (e.g., the combined output or downmixed signal 204) and the generation of the spatial information may be accomplished by estimating spatial information using sources other than audio sources. In this regard, for example, the devices at a particular site (e.g., the slave terminals 142, 144, 146 and the master device 140) may be enabled to determine spatial information using radio frequency (RF) or other techniques for determining spatial information (e.g., a priori knowledge of device location, GPS positioning, etc.). As an example, each of the devices may include an RF communication module (e.g., RF module 248 of FIG. 14) for enabling communications with each other device. In some cases, the RF communication module of one or more of the devices (e.g., the master device 140) may be able to estimate a location of each other device. Thus, arbitrary locations or positions of each of the devices may become known. As such, the devices that may initially be located or distributed in random or arbitrary locations be have known locations to enable the generation of spatial information. In an exemplary embodiment, the RF module 248 may be utilized to determine relative positions of each of the devices so that the microphones of the devices (at discovered or known positions as a result of the RF module's operation) may operate in similar fashion to a MMic. As indicated above, in some embodiments the synchronizer 250 may be employed to account for possible latency variation between individual ones of the slave terminals 142, 144, 146 and the master device 140. Other alternatives for MMic spatial information detection or determination may also be utilized. In this regard, for example, microphone signals may be mapped within the master device 140 to a circle in any order. The detection of location in some cases may therefore be using the best microphone signal. In this case, the mapping to spatial parameters may try to represent the actual spatial configuration of sound sources. Alternatively, a modified or arbitrary mapping could be used.

In the preceding description, it has been assumed that there is a master terminal (e.g., the master device 140) in the conference room or acoustic space of interest. Alternatively, master functionality can be implemented in a network infrastructure, such as the conference switch 148 where mixing operations and spatio-temporal directivity encoding may also take place. Accordingly, embodiments of the present invention may provide for the provision of distributed teleconferencing using an apparatus capable of receiving audio signal inputs from a plurality of terminals in a common acoustic space and providing a combined or mixed uplink audio signal based on the received audio inputs and also providing spatial information indicative of spatial parameters associated with the signals provided by the terminals. In some embodiments, the spatial information may be obtained from a signals other than those used to produce the combined uplink audio signal. Furthermore, in some embodiments, the spatial information may be obtained from sources other than audio sources. In an exemplary embodiment, the spatial information may be obtained from the same signals used to produce the combined uplink audio signal, which may be employed as a backup mechanism in some situations. Embodiments may provide improved speech quality since, for example, the speech of the active talker can be picked up by the nearest microphone (or at least the best picked up signal may be utilized). Additionally, exemplary embodiments may provide an improved or more realistic representation of conference participants.

As indicated above, embodiments of the present invention may be practiced in conjunction with mobile devices or terminals. FIG. 12 illustrates a block diagram of a mobile terminal 10 that may benefit from embodiments of the present invention. It should be understood, however, that a mobile telephone as illustrated and hereinafter described is merely illustrative of one type of mobile terminal that would benefit from embodiments of the present invention and, therefore, should not be taken to limit the scope of embodiments of the present invention. While an embodiment of the mobile terminal 10 is illustrated and will be hereinafter described for purposes of example, other types of mobile terminals, such as portable digital assistants (PDAs), pagers, mobile televisions, gaming devices, laptop computers, cameras, video recorders, audio/video player, radio, GPS devices, or any combination of the aforementioned, and other types of voice and text communications systems, can readily employ embodiments of the present invention.

In addition, while several embodiments of the present invention may be performed or used by a mobile terminal 10, embodiments may be employed by other than a mobile terminal. Moreover, the system and method of embodiments of the present invention will be primarily described in conjunction with mobile communications applications. It should be understood, however, that the system and method of embodiments of the present invention can be utilized in conjunction with a variety of other applications, both in the mobile communications industries and outside of the mobile communications industries.

The mobile terminal 10 may include an antenna 12 (or multiple antennas) in operable communication with a transmitter 14 and a receiver 16. The mobile terminal 10 may further include an apparatus, such as a controller 20 or other processing element, that provides signals to and receives signals from the transmitter 14 and receiver 16, respectively. The signals include signaling information in accordance with the air interface standard of the applicable cellular system, and also user speech, received data and/or user generated data. In this regard, the mobile terminal 10 is capable of operating with one or more air interface standards, communication protocols, modulation types, and access types. By way of illustration, the mobile terminal 10 is capable of operating in accordance with any of a number of first, second, third and/or fourth-generation communication protocols or the like. For example, the mobile terminal 10 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA2000, wideband CDMA (WCDMA) and time division-synchronous CDMA (TD-SCDMA), with 3.9G wireless communication protocols such as Evolved Universal Terrestrial Radio Access (E-UTRAN), with fourth-generation (4G) wireless communication protocols or the like. As an alternative (or additionally), the mobile terminal 10 may be capable of operating in accordance with non-cellular communication mechanisms. For example, the mobile terminal 10 may be capable of communication in a wireless local area network (WLAN) or other communication networks described below in connection with FIG. 13.

It is understood that the apparatus, such as the controller 20, may include circuitry desirable for implementing audio and logic functions of the mobile terminal 10. For example, the controller 20 may be comprised of a digital signal processor device, a microprocessor device, and various analog to digital converters, digital to analog converters, and other support circuits. Control and signal processing functions of the mobile terminal 10 are allocated between these devices according to their respective capabilities. The controller 20 thus may also include the functionality to convolutionally encode and interleave message and data prior to modulation and transmission. The controller 20 can additionally include an internal voice coder, and may include an internal data modem. Further, the controller 20 may include functionality to operate one or more software programs, which may be stored in memory. For example, the controller 20 may be capable of operating a connectivity program, such as a conventional Web browser. The connectivity program may then allow the mobile terminal 10 to transmit and receive Web content, such as location-based content and/or other web page content, according to a Wireless Application Protocol (WAP), Hypertext Transfer Protocol (HTTP) and/or the like, for example.

The mobile terminal 10 may also comprise a user interface including an output device such as a conventional earphone or speaker 24, a ringer 22, a microphone 26, a display 28, and a user input interface, all of which are coupled to the controller 20. The user input interface, which allows the mobile terminal 10 to receive data, may include any of a number of devices allowing the mobile terminal 10 to receive data, such as a keypad 30, a touch display (not shown) or other input device. In embodiments including the keypad 30, the keypad 30 may include the conventional numeric (0-9) and related keys (#, *), and other hard and soft keys used for operating the mobile terminal 10. Alternatively, the keypad 30 may include a conventional QWERTY keypad arrangement. The keypad 30 may also include various soft keys with associated functions. In addition, or alternatively, the mobile terminal 10 may include an interface device such as a joystick or other user input interface. The mobile terminal 10 further includes a battery 34, such as a vibrating battery pack, for powering various circuits that are required to operate the mobile terminal 10, as well as optionally providing mechanical vibration as a detectable output.

The mobile terminal 10 may further include a user identity module (UIM) 38. The UIM 38 is typically a memory device having a processor built in. The UIM 38 may include, for example, a subscriber identity module (SIM), a universal integrated circuit card (UICC), a universal subscriber identity module (USIM), a removable user identity module (R-UIM), etc. The UIM 38 typically stores information elements related to a mobile subscriber. In addition to the UIM 38, the mobile terminal 10 may be equipped with memory. For example, the mobile terminal 10 may include volatile memory 40, such as volatile Random Access Memory (RAM) including a cache area for the temporary storage of data. The mobile terminal 10 may also include other non-volatile memory 42, which can be embedded and/or may be removable. The non-volatile memory 42 can additionally or alternatively comprise an electrically erasable programmable read only memory (EEPROM), flash memory or the like, such as that available from the SanDisk Corporation of Sunnyvale, Calif., or Lexar Media Inc. of Fremont, Calif. The memories can store any of a number of pieces of information, and data, used by the mobile terminal 10 to implement the functions of the mobile terminal 10. For example, the memories can include an identifier, such as an international mobile equipment identification (IMEI) code, capable of uniquely identifying the mobile terminal 10. Furthermore, the memories may store instructions for determining cell id information. Specifically, the memories may store an application program for execution by the controller 20, which determines an identity of the current cell, i.e., cell id identity or cell id information, with which the mobile terminal 10 is in communication.

FIG. 13 is a schematic block diagram of a wireless communications system according to an exemplary embodiment of the present invention. Referring now to FIG. 13, an illustration of one type of system that would benefit from embodiments of the present invention is provided. The system includes a plurality of network devices. As shown, one or more mobile terminals 10 may each include an antenna 12 for transmitting signals to and for receiving signals from a base site or base station (BS) 44. The base station 44 may be a part of one or more cellular or mobile networks each of which includes elements required to operate the network, such as a mobile switching center (MSC) 46. As well known to those skilled in the art, the mobile network may also be referred to as a Base Station/MSC/Interworking function (BMI). In operation, the MSC 46 is capable of routing calls to and from the mobile terminal 10 when the mobile terminal 10 is making and receiving calls. The MSC 46 can also provide a connection to landline trunks when the mobile terminal 10 is involved in a call. In addition, the MSC 46 can be capable of controlling the forwarding of messages to and from the mobile terminal 10, and can also control the forwarding of messages for the mobile terminal 10 to and from a messaging center. It should be noted that although the MSC 46 is shown in the system of FIG. 13, the MSC 46 is merely an exemplary network device and embodiments of the present invention are not limited to use in a network employing an MSC.

The MSC 46 can be coupled to a data network, such as a local area network (LAN), a metropolitan area network (MAN), and/or a wide area network (WAN). The MSC 46 can be directly coupled to the data network. In one typical embodiment, however, the MSC 46 is coupled to a gateway device (GTW) 48, and the GTW 48 is coupled to a WAN, such as the Internet 50. In turn, devices such as processing elements (e.g., personal computers, server computers or the like) can be coupled to the mobile terminal 10 via the Internet 50. For example, as explained below, the processing elements can include one or more processing elements associated with a computing system 52 (two shown in FIG. 13), origin server 54 (one shown in FIG. 2) or the like, as described below.

The BS 44 can also be coupled to a serving GPRS (General Packet Radio Service) support node (SGSN) 56. As known to those skilled in the art, the SGSN 56 is typically capable of performing functions similar to the MSC 46 for packet switched services. The SGSN 56, like the MSC 46, can be coupled to a data network, such as the Internet 50. The SGSN 56 can be directly coupled to the data network. In a more typical embodiment, however, the SGSN 56 is coupled to a packet-switched core network, such as a GPRS core network 58. The packet-switched core network is then coupled to another GTW 48, such as a gateway GPRS support node (GGSN) 60, and the GGSN 60 is coupled to the Internet 50. In addition to the GGSN 60, the packet-switched core network can also be coupled to a GTW 48. Also, the GGSN 60 can be coupled to a messaging center. In this regard, the GGSN 60 and the SGSN 56, like the MSC 46, may be capable of controlling the forwarding of messages, such as MMS messages. The GGSN 60 and SGSN 56 may also be capable of controlling the forwarding of messages for the mobile terminal 10 to and from the messaging center.

In addition, by coupling the SGSN 56 to the GPRS core network 58 and the GGSN 60, devices such as a computing system 52 and/or origin server 54 may be coupled to the mobile terminal 10 via the Internet 50, SGSN 56 and GGSN 60. In this regard, devices such as the computing system 52 and/or origin server 54 may communicate with the mobile terminal 10 across the SGSN 56, GPRS core network 58 and the GGSN 60. By directly or indirectly connecting mobile terminals 10 and the other devices (e.g., computing system 52, origin server 54, etc.) to the Internet 50, the mobile terminals 10 may communicate with the other devices and with one another, such as according to the Hypertext Transfer Protocol (HTTP) and/or the like, to thereby carry out various functions of the mobile terminals 10.

Although not every element of every possible mobile network is shown and described herein, it should be appreciated that the mobile terminal 10 may be coupled to one or more of any of a number of different networks through the BS 44. In this regard, the network(s) may be capable of supporting communication in accordance with any one or more of a number of first-generation (1G), second-generation (2G), 2.5G, third-generation (3G), 3.9G, fourth-generation (4G) mobile communication protocols or the like. For example, one or more of the network(s) can be capable of supporting communication in accordance with 2G wireless communication protocols IS-136 (TDMA), GSM, and IS-95 (CDMA). Also, for example, one or more of the network(s) can be capable of supporting communication in accordance with 2.5G wireless communication protocols GPRS, Enhanced Data GSM Environment (EDGE), or the like. Further, for example, one or more of the network(s) can be capable of supporting communication in accordance with 3G wireless communication protocols such as a UMTS network employing WCDMA radio access technology. Some narrow-band analog mobile phone service (NAMPS), as well as total access communication system (TACS), network(s) may also benefit from embodiments of the present invention, as should dual or higher mode mobile stations (e.g., digital/analog or TDMA/CDMA/analog phones).

The mobile terminal 10 can further be coupled to one or more wireless access points (APs) 62. The APs 62 may comprise access points configured to communicate with the mobile terminal 10 in accordance with techniques such as, for example, radio frequency (RF), infrared (IrDA) or any of a number of different wireless networking techniques, including WLAN techniques such as IEEE 802.11 (e.g., 802.11a, 802.11b, 802.11g, 802.11n, etc.), world interoperability for microwave access (WiMAX) techniques such as IEEE 802.16, and/or wireless Personal Area Network (WPAN) techniques such as IEEE 802.15, BlueTooth (BT), ultra wideband (UWB) and/or the like. The APs 62 may be coupled to the Internet 50. Like with the MSC 46, the APs 62 can be directly coupled to the Internet 50. In one embodiment, however, the APs 62 are indirectly coupled to the Internet 50 via a GTW 48. Furthermore, in one embodiment, the BS 44 may be considered as another AP 62. As will be appreciated, by directly or indirectly connecting the mobile terminals 10 and the computing system 52, the origin server 54, and/or any of a number of other devices, to the Internet 50, the mobile terminals 10 can communicate with one another, the computing system, etc., to thereby carry out various functions of the mobile terminals 10, such as to transmit data, content or the like to, and/or receive content, data or the like from, the computing system 52. As used herein, the terms "data," "content," "information" and similar terms may be used interchangeably to refer to data capable of being transmitted, received and/or stored in accordance with embodiments of the present invention. Thus, use of any such terms should not be taken to limit the spirit and scope of embodiments of the present invention.

Although not shown in FIG. 13, in addition to or in lieu of coupling the mobile terminal 10 to computing systems 52 across the Internet 50, the mobile terminal 10 and computing system 52 may be coupled to one another and communicate in accordance with, for example, RF, BT, IrDA or any of a number of different wireline or wireless communication techniques, including LAN, WLAN, WiMAX, UWB techniques and/or the like. One or more of the computing systems 52 can additionally, or alternatively, include a removable memory capable of storing content, which can thereafter be transferred to the mobile terminal 10. Further, the mobile terminal 10 can be coupled to one or more electronic devices, such as printers, digital projectors and/or other multimedia capturing, producing and/or storing devices (e.g., other terminals). Like with the computing systems 52, the mobile terminal 10 may be configured to communicate with the portable electronic devices in accordance with techniques such as, for example, RF, BT, IrDA or any of a number of different wireline or wireless communication techniques, including universal serial bus (USB), LAN, WLAN, WiMAX, UWB techniques and/or the like.

In an exemplary embodiment, content or data may be communicated over the system of FIG. 13 between a mobile terminal, which may be similar to the mobile terminal 10 of FIG. 12, and a network device of the system of FIG. 13 in order to, for example, execute applications or establish communication (for example, for purposes of content or information sharing) between the mobile terminal 10 and other mobile terminals. As such, it should be understood that the system of FIG. 13 need not be employed for communication between mobile terminals or between a network device and the mobile terminal, but rather FIG. 13 is merely provided for purposes of example. Furthermore, it should be understood that embodiments of the present invention may be resident on a communication device such as the mobile terminal 10, and/or may be resident on a server, personal computer or other device, absent any communication with the system of FIG. 13.

Furthermore, in an exemplary embodiment, one or more of the terminals of FIG. 13 may be disposed at a particular site (e.g., site A) while one or more other terminals of FIG. 13 may be disposed at another site (e.g., site B or C), for example, in the context of a teleconferencing application. In such an embodiment, one of the network devices of FIG. 13 (e.g., the computing system 52 and/or origin server 54) may operate as a conferencing server, which may include or be in communication with a conferencing bridge or switch (e.g., the conference switch 148) for facilitating conference calling between parties involved in a conference call. As such, the conferencing server may receive uplink audio signals from each site and distribute downlink signals comprising a combination of all uplink signals (except possibly the uplink signal of the specific site receiving each respective downlink signal) to each of the sites. In a distributed network environment, the conferencing server may ensure distribution of downlink signals to one terminal at each site (e.g., a master device) and the one terminal may distribute the downlink signal to other devices at the site. However, embodiments of the present invention may be applicable in other environments than just teleconferencing. In this regard, embodiments of the present invention may be useful in any environment in which spatial information is desirably included along with a combined audio signal.

An exemplary embodiment of the invention will now be described with reference to FIG. 14, in which certain elements of an apparatus for enabling utilization of spatial information for audio signal enhancement in a multiple microphone/distributed network environment are displayed. The apparatus of FIG. 14 may be embodied as or otherwise employed, for example, on the mobile terminal 10 of FIG. 12 or a network device such as a server of FIG. 13. However, it should be noted that the apparatus of FIG. 14, may also be employed on a variety of other devices, both mobile and fixed, and therefore, embodiments of the present invention should not be limited to application on devices such as mobile terminals or servers. It should also be noted that while FIG. 14 illustrates one example of a configuration of an apparatus for enabling r utilization of spatial information for audio signal enhancement in a multiple microphone/distributed network environment, numerous other configurations may also be used to implement embodiments of the present invention.

Referring now to FIG. 14, an apparatus for enabling utilization of spatial information for audio signal enhancement in a multiple microphone/distributed network environment is provided. The apparatus may include or otherwise be in communication with a processor 70, a user interface 72, a communication interface 74 and a memory device 76. The memory device 76 may include, for example, volatile and/or non-volatile memory (e.g., volatile memory 40 and/or non-volatile memory 42). The memory device 76 may be configured to store information, data, applications, instructions or the like for enabling the apparatus to carry out various functions in accordance with exemplary embodiments of the present invention. For example, the memory device 76 could be configured to buffer input data for processing by the processing element 70. Additionally or alternatively, the memory device 76 could be configured to store instructions for execution by the processor 70. As yet another alternative, the memory device 76 may be one of a plurality of databases that store information in the form of static and/or dynamic information.

The processor 70 may be embodied in a number of different ways. For example, the processor 70 may be embodied as a processing element, a coprocessor, a controller or various other processing means or devices including integrated circuits such as, for example, an ASIC (application specific integrated circuit) or FPGA (field programmable gate array). In an exemplary embodiment, the processor 70 may be configured to execute instructions stored in the memory device 76 or otherwise accessible to the processor 70. Meanwhile, the communication interface 74 may be embodied as any device or means embodied in either hardware, software, or a combination of hardware and software that is configured to receive and/or transmit data from/to a network and/or any other device or module in communication with the apparatus. In this regard, the communication interface 74 may include, for example, an antenna and supporting hardware and/or software for enabling communications with a wireless communication network.

The user interface 72 may be in communication with the processor 70 to receive an indication of a user input at the user interface 72 and/or to provide an audible, visual, mechanical or other output to the user. As such, the user interface 72 may include, for example, a keyboard, a mouse, a joystick, a trackball, a touch screen display, a conventional display, a microphone, a speaker, or other input/output mechanisms. In an exemplary embodiment in which the apparatus is embodied as a server, the user interface 72 may be limited, or even eliminated.

In an exemplary embodiment, the processor 70 may be embodied as, include or otherwise control a conference manager 78. The conference manager 78 may be any means or device embodied in hardware, software, or a combination of hardware and software that is configured to carry out the functions of the conference manager 78 as described herein. In this regard, for example, the conference manager 78 may be configured to determine a role for the respective mobile terminal 10 (and possibly also other terminals) with respect to conferencing applications. In this regard, for example, the conference manager 78 may be configured to receive a manual input from the user via the user interface 72 directing the conference manager 78 to communicate with other terminals within the same acoustic space or within a predetermined distance to establish a distributed network for teleconferencing services. In this regard, the conference manager 78 may direct other terminals to take a slave role and may itself assume a master role with respect to the other devices in relation to conference communications conducted with a conference switch (e.g., conference switch 148). In an alternative embodiment, rather than responding to a manual instruction, the conference manager 78 may be configured to receive information from a plurality of mobile terminals and assign the mobile terminals a role based on the capabilities and/or settings of each respective terminal. For example, the conference manager 78 may be configured to determine whether any devices in the same acoustic space include a MMic and may designate one or more such devices to provide MMic data to the master device (or determine spatial information for communication to the master device if such device is capable of determining spatial information). Once roles are defined for network devices in the same acoustic space, the conference manager 78 may also manage actions of the mobile terminal 10 associated therewith in accordance with the role defined for the mobile terminal 10. As such, the receipt of data from and/or distribution of data to other networked devices may be controlled by the conference manager 78 based on whether the mobile terminal 10 is a master device or a slave device.

In an exemplary embodiment, the conference manager 78 may include or otherwise be in communication with (and perhaps control) an encoder 80. The modified encoder 200 and/or the encoder 300 may be examples of the encoder 80. As such, the encoder 80 may be configured to provide both distributed conferencing by combining audio signals from the networked terminals (e.g., from separate and arbitrarily located microphone audio sources) to provide a mixed audio uplink signal and corresponding spatial information as described above in greater detail. As indicated above, in some embodiments, the encoder 80 may include or be in communication with a device configured to provide spatial information by a mechanism other than using a MMic. In an exemplary embodiment, the conference manager 78 may also include a decoder 82 for decoding and distributing downlink data to each of the networked terminals.

In an exemplary embodiment, the processor 70 may optionally also be embodied as, include or otherwise control the synchronizer 250 and the RF module 248. The synchronizer 250 and the RF module 248 may each be any means or device embodied in hardware, software, or a combination of hardware and software that is configured to carry out the functions of the synchronizer 250 and the RF module 248, respectively, as described herein.

According to one exemplary embodiment in which the processor 70 is configured to perform the functions of the devices described above in connection with FIG. 14, the apparatus of FIG. 14 may be configured to receive a plurality of audio signals including at least one audio signal received at a first device and at least a second audio signal received at a second device in which the first and second devices are part of a common acoustic space network and are arbitrarily positioned with respect to each other. The apparatus may be further configured to combine the first and second audio signals to form a composite audio signal, and provide for communication of the composite audio signal along with spatial information indicative of a spatial parameter relating to a sound source of at least one of the plurality of audio signals to another device.

FIGS. 15 and 16 are flowcharts of a system, method and program product according to exemplary embodiments of the invention. It will be understood that each block or step of the flowcharts, and combinations of blocks in the flowcharts, can be implemented by various means, such as hardware, firmware, and/or software including one or more computer program instructions. For example, one or more of the procedures described above may be embodied by computer program instructions. In this regard, the computer program instructions which embody the procedures described above may be stored by a memory device of the mobile terminal or server and executed by a processor in the mobile terminal or server. As will be appreciated, any such computer program instructions may be loaded onto a computer or other programmable apparatus (i.e., hardware) to produce a machine, such that the instructions which execute on the computer or other programmable apparatus create means for implementing the functions specified in the flowcharts block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowcharts block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowcharts block(s) or step(s).

Accordingly, blocks or steps of the flowcharts support combinations of means for performing the specified functions, combinations of steps for performing the specified functions and program instruction means for performing the specified functions. It will also be understood that one or more blocks or steps of the flowcharts, and combinations of blocks or steps in the flowcharts, can be implemented by special purpose hardware-based computer systems which perform the specified functions or steps, or combinations of special purpose hardware and computer instructions.

In this regard, one embodiment of a method for utilizing spatial information for audio signal enhancement in a distributed network environment as provided in FIG. 15 may include receiving representations of a plurality of audio signals including at least a first audio signal received at a first device and at least a second audio signal received at a second device at operation 400. The representations may be, for example, digital or other representations of a corresponding audio signal. The first and second devices may be part of a common acoustic space network (e.g., networked devices in communication with each other) and being arbitrarily positioned with respect to each other. In other words, the first and second devices may be part of, for example, an ad hoc network. The method may further include combining the first and second audio signals to form a composite audio signal at operation 410. In an exemplary embodiment, operation 410 may include selecting for inclusion in the composite audio signal, one of the first and second audio signals that is closest to a sound source of sound determinable in both the first and second audio signals. The method may further include providing for communication of the composite audio signal along with spatial information indicative of a spatial parameter relating to a sound source of at least one of the plurality of audio signals to another device at operation 420.

Alternative exemplary embodiments may include additional optional operations (shown in dashed lines in FIG. 15) and/or modifications to the above recited operations. In an exemplary embodiment, receiving the plurality of audio signals may include receiving a set of audio signals received at a multiple microphone array in which microphones of the array are located at fixed distances from each other. Meanwhile, the method may further include operation 412 of generating the spatial information based on the set of audio signals received at the multiple microphone array, based on the first and second audio signals, or based on signals other than those used to produce the composite audio signal. In a situation where operation 412 includes generating the spatial information based on signals other than those used to produce the composite audio signal, operation 412 may further include generating the spatial information based on signals that are not audio signals (e.g., based on RF signals).

In an exemplary embodiment in which operation 412 includes generating the spatial information based on the set of audio signals received at the multiple microphone array, the method may also include utilizing the spatial information generated from the set of audio signals to calibrate a device to generate other spatial information that is generated by the device based on the first and second audio signals at operation 414. In such an embodiment, the method may further include operation 416 of, in response to a loss of the set of audio signals, switching to communicating the other spatial information instead of the spatial information. In an exemplary embodiment, the method may further include, in response to the set of audio signals having a superior acoustic property than the first and second signals, replacing the composite audio signal with an audio signal based on the set of audio signals at operation 418.

In an exemplary embodiment in which operation 412 includes generating the spatial information based on the first and second audio signals, operation 412 may further include generating the spatial information based on the first and second audio signals and based on a determination of relative locations of the first and second devices.

Another exemplary embodiment of a method for utilizing spatial information for audio signal enhancement in a distributed network environment, as provided in FIG. 16, may include receiving representations of a plurality of audio signals including at least a first audio signal received at a first device and at least a second audio signal received at a second device at operation 500. The first and second devices may be part of a common acoustic space network and being arbitrarily positioned with respect to each other. The method may further include dividing the first and second audio signals into two or more frequency bands at operation 510 and combining the first and second audio signals on each of the frequency bands separately to form a composite audio signal at operation 520. In some embodiments, the combining of the first and second audio signals may be based on spatial information.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
    causing representations of a plurality of audio signals to be captured in a common acoustic space including at least a first audio signal received at a first device and at least a second audio signal received at a second device, the first and second devices being part of a common acoustic space network and being arbitrarily positioned in the common acoustic space with respect to each other;
    combining the first and second audio signals to form a composite audio signal; and
    causing the composite audio signal along with spatial information relating to a sound source of at least one of the plurality of audio signals to be communicated to another device located outside said common acoustic space network.

2. The method of claim 1, wherein causing representations of the plurality of audio signals to be captured comprises receiving a set of audio signals received at a multiple microphone array in which microphones of the array are located at fixed distances from each other and wherein the method further comprises generating the spatial information based on the set of audio signals received at the multiple microphone array.

3. The method of claim 2, further comprising utilizing the spatial information generated from the set of audio signals to calibrate a device to generate other spatial information, the other spatial information being generated by the device based on the first and second audio signals.

4. The method of claim 3, further comprising, in response to a loss of the set of audio signals, switching to communicating the other spatial information instead of the spatial information.

5. The method of claim 2, further comprising, in response to the set of audio signals having a superior acoustic property than the first and second signals, replacing the composite audio signal with an audio signal based on the set of audio signals.

6. The method of claim 1, further comprising generating the spatial information based on signals other than those used to produce the composite audio signal.

7. The method of claim 6, wherein generating the spatial information based on signals other than those used to produce the composite audio signal comprises generating the spatial information based on signals that are not audio signals.

8. The method of claim 7, wherein generating the spatial information based on signals that are not audio signals comprises generating the spatial information based on radio frequency techniques.

9. The method of claim 1, wherein combining the first and second audio signals to form the composite audio signal comprises including in the composite audio signal one of the first and second audio signals that includes a superior acoustic property relative to the other of the first and second audio signals.

10. The method of claim 1, wherein the combining the first and second audio signals to form the composite audio signal comprises dividing the first and second audio signals into two or more frequency bands and forming the composite audio signal based on combining each of the frequency bands separately.

11. The method of claim 1, further comprising generating the spatial information based on the first and second audio signals.

12. The method of claim 11, wherein generating the spatial information based on the first and second audio signals further comprises generating the spatial information based on the first and second audio signals and based on a determination of relative locations of the first and second devices.

13. A computer program product comprising at least one computer-readable non-transitory storage medium having computer-executable program code portions stored therein, the computer-readable program code portions comprising:
    a first program code portion for causing representations of a plurality of audio signals to be captured in a common acoustic space network including at least a first audio signal received at a first device and at least a second audio signal received at a second device, the first and second devices being part of a common acoustic space network and being arbitrarily positioned in the common acoustic space with respect to each other;
    a second program code portion for combining the first and second audio signals to form a composite audio signal; and a third program code portion for causing the composite audio signal along with spatial information relating to a sound source of at least one of the plurality of audio signals to be communicated to another device located outside said common acoustic space network.

14. The computer program product of claim 13, wherein the first program code portion includes instructions for causing a set of audio signals received at a multiple microphone array in which microphones of the array are located at fixed distances from each other to be captured and wherein the computer program product further comprises a fourth program code portion for generating the spatial information based on the set of audio signals received at the multiple microphone array.

15. The computer program product of claim 14, further comprising a fifth program code portion for utilizing the spatial information generated from the set of audio signals to calibrate a device to generate other spatial information, the other spatial information being generated by the device based on the first and second audio signals.

16. The computer program product of claim 15, further comprising a sixth program code portion for, in response to a loss of the set of audio signals, switching to communicating the other spatial information instead of the spatial information.

17. The computer program product of claim 14, further comprising a fifth program code portion for, in response to the set of audio signals having a superior acoustic property than the first and second signals, replacing the composite audio signal with an audio signal based on the set of audio signals.

18. The computer program product of claim 13, further comprising a fourth program code portion for generating the spatial information based on signals other than those used to produce the composite audio signal.

19. The computer program product of claim 18, wherein the fourth program code portion includes instructions for generating the spatial information based on signals that are not audio signals.

20. The computer program product of claim 19, wherein the fourth program code portion includes instructions for generating the spatial information based on radio frequency techniques.

21. The computer program product of claim 13, wherein the second program code portion includes instructions for including in the composite audio signal one of the first and second audio signals that includes a superior acoustic property relative to the other of the first and second audio signals.

22. The computer program product of claim 13, wherein the second program code portion includes instructions for combining the first and second audio signals to form the composite audio signal by dividing the first and second audio signals into two or more frequency bands and forming the composite audio signal based on combining each of the frequency bands separately.

23. The computer program product of claim 13, further comprising a fourth program code portion for generating the spatial information based on the first and second audio signals.

24. The computer program product of claim 23, wherein the fourth program code portion includes instructions for generating the spatial information based on the first and second audio signals and based on a determination of relative locations of the first and second devices.

25. An apparatus comprising:
a processor; and
a memory including computer program code, the memory and the computer program code configured to, with the processor, cause the apparatus to at least:
cause representations of a plurality of audio signals to be captured in a common acoustic space network including at least a first audio signal received at a first device and at least a second audio signal received at a second device, the first and second devices being part of a common acoustic space network and being arbitrarily positioned in the common acoustic space with respect to each other;
combine the first and second audio signals to form a composite audio signal; and
cause the composite audio signal along with spatial information relating to a sound source of at least one of the plurality of audio signals to be communicated to another device located outside said common acoustic space network.

26. The apparatus of claim 25, wherein the memory including the computer program code is further configured to, with the processor, cause the apparatus to capture a set of audio signals received at a multiple microphone array in which microphones of the array are located at fixed distances from each other and generate the spatial information based on the set of audio signals received at the multiple microphone array.

27. The apparatus of claim 26, wherein the memory including the computer program code is further configured to, with the processor, cause the apparatus to utilize the spatial information generated from the set of audio signals to calibrate a device to generate other spatial information, the other spatial information being generated by the device based on the first and second audio signals.

28. The apparatus of claim 27, wherein the memory including the computer program code is further configured to, with the processor, cause the apparatus to, in response to a loss of the set of audio signals, switch to communicating the other spatial information instead of the spatial information.

29. The apparatus of claim 26, wherein the memory including the computer program code is further configured to, with the processor, cause the apparatus to, in response to the set of audio signals having a superior acoustic property than the first and second signals, replace the composite audio signal with an audio signal based on the set of audio signals.

30. The apparatus of claim 25, wherein the memory including the computer program code is further configured to, with the processor, cause the apparatus to generate the spatial information based on signals other than those used to produce the composite audio signal.

31. The apparatus of claim 30, wherein the memory including the computer program code is further configured to, with the processor, cause the apparatus to generate the spatial information based on signals other than those used to produce the composite audio signal by generating the spatial information based on signals that are not audio signals.

32. The apparatus of claim 31, wherein the memory including the computer program code is further configured to, with the processor, cause the apparatus to generate the spatial information based on radio frequency techniques.

33. The apparatus of claim 25, wherein the memory including the computer program code is further configured to, with the processor, cause the apparatus to combine the first and second audio signals to form the composite audio signal by including in the composite audio signal one of the first and second audio signals that includes a superior acoustic property relative to the other of the first and second audio signals.

34. The apparatus of claim 31, wherein the processor is configured to combine the first and second audio signals to form the composite audio signal by dividing the first and second audio signals into two or more frequency bands and forming the composite audio signal based on combining each of the frequency bands separately.

35. The apparatus of claim 25, wherein the memory including the computer program code is further configured to, with the processor, cause the apparatus to generate the spatial information based on the first and second audio signals.

36. The apparatus of claim 35, wherein the memory including the computer program code is further configured to, with the processor, cause the apparatus to generate the spatial information based on the first and second audio signals further by generating the spatial information based on the first and second audio signals and based on a determination of relative locations of the first and second devices.

37. An apparatus comprising:

means for causing representations of a plurality of audio signals to be captured in a common acoustic space network including at least one audio signal received at a first device and at least a second audio signal received at a second device, the first and second devices being part of a common acoustic space network and being arbitrarily positioned in the common acoustic space with respect to each other;

means for combining the first and second audio signals to form a composite audio signal; and means for causing the composite audio signal along with spatial information relating to a sound source of at least one of the plurality of audio signals to be communicated to another device located outside said common acoustic space network.

* * * * *